United States Patent
Dent

(10) Patent No.: US 6,577,199 B2
(45) Date of Patent: Jun. 10, 2003

(54) HARMONIC MATCHING NETWORK FOR A SATURATED AMPLIFIER

(75) Inventor: Paul W. Dent, Pittsboro, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 27 days.

(21) Appl. No.: 09/730,791

(22) Filed: Dec. 7, 2000

(65) Prior Publication Data

US 2002/0105384 A1 Aug. 8, 2002

(51) Int. Cl.[7] .................................................. H03F 3/04
(52) U.S. Cl. ........................................ 330/302; 330/306
(58) Field of Search ................................. 330/302, 306

(56) References Cited

U.S. PATENT DOCUMENTS

| | | | |
|---|---|---|---|
| 3,461,372 A | 8/1969 | Pickup et al. .................. 321/9 |
| 3,919,656 A | * 11/1975 | Sokal et al. ................. 330/192 |
| 4,350,958 A | 9/1982 | Pagnamenta ................. 330/286 |
| 4,423,388 A | 12/1983 | Crescenzi, Jr. et al. ..... 330/277 |
| 4,717,884 A | 1/1988 | Mitzlaff ....................... 330/251 |
| 5,023,866 A | 6/1991 | De Muro ...................... 370/24 |
| 5,095,285 A | 3/1992 | Khatibzadeh ............... 330/306 |
| 5,105,167 A | * 4/1992 | Peczalski .................... 330/286 |
| 5,146,178 A | 9/1992 | Nojima et al. .............. 330/251 |
| 5,164,683 A | 11/1992 | Shields ....................... 330/307 |
| 5,172,072 A | 12/1992 | Willems et al. ............. 330/149 |
| 5,270,668 A | 12/1993 | Ikeda et al. ................. 330/286 |
| 5,274,341 A | 12/1993 | Sekine et al. ............... 330/269 |
| 5,300,895 A | 4/1994 | Jones ......................... 330/251 |
| 5,329,249 A | 7/1994 | Cripps ........................ 330/302 |
| 5,347,229 A | 9/1994 | Suckling et al. ............ 330/251 |
| 5,352,990 A | 10/1994 | Goto .......................... 330/286 |
| 5,473,281 A | 12/1995 | Honjo ........................ 330/286 |
| 5,614,863 A | 3/1997 | Pierro et al. ................. 330/1 R |
| 5,745,857 A | 4/1998 | Maeng et al. ............... 455/553 |
| 5,767,743 A | 6/1998 | Morimoto et al. .......... 330/294 |
| 5,815,531 A | 9/1998 | Dent ........................... 375/298 |
| 5,930,128 A | 7/1999 | Dent ........................... 363/43 |
| 5,939,939 A | 8/1999 | Gaynor et al. .......... 330/124 R |
| 6,130,589 A | * 10/2000 | Yamaguchi et al. ......... 330/302 |

FOREIGN PATENT DOCUMENTS

WO    WO 02/31966 A2    4/2002

* cited by examiner

Primary Examiner—Patricia T. Nguyen
(74) Attorney, Agent, or Firm—Harrity & Snyder, L.L.P.

(57) ABSTRACT

Systems and methods for increasing the efficiency of direct current (DC) power to radio frequency (RF) power include a harmonic matching network that inhibits harmonic current flow for a number of harmonic frequencies. The matching network includes a number of sections, where each section generates an impedance that resonates with the output capacitance at a harmonic frequency. Each section of the matching network also creates a high impedance to the amplifier at the respective odd harmonic frequency.

23 Claims, 18 Drawing Sheets

HARMONIC MATCHING NETWORK FOR A SATURATED AMPLIFIER

BACKGROUND OF THE INVENTION

The present invention relates generally to power amplifiers and, more particularly, to increasing the efficiency of power amplifiers.

Power amplifiers are essential components in many electronic devices. For example, in cellular devices, such as cellular telephones, a transmitter power amplifier converts power from a direct current (DC) power source to radio frequency (RF) power for transmitting RF signals to other devices. Such RF power amplifiers operate at maximum efficiency, in relation to DC to RF power, when operating at or near their saturated power output level.

Many cellular applications use saturated transmitters, such as devices operating in accordance with the U.S. advanced mobile phone system (AMPS) analog frequency modulation (FM) system or the global system for mobile communications (GSM) digital cellular system. Cellular devices using linear modulation schemes, such as devices operating in accordance with the U.S. digital system known as D-AMPS or IS136, do not use saturated amplifiers and therefore, battery life or "talk time" is not as high as when saturated amplifiers are used. Saturated amplifiers, however, have been employed to amplify linear signals.

BRIEF SUMMARY OF THE INVENTION

The present invention is directed to harmonic matching circuits for saturated amplifiers. Such harmonic circuits may also be useful in linear amplifier applications, such as IS136/D-AMPS.

According to one implementation of the present invention as embodied and broadly described herein, a transmitter power amplifier that converts power from a DC supply to RF in a load resistance is provided. The transmitter power amplifier includes an amplifier that includes at least one active output device, where the amplifier has an output capacitance. The transmitter power amplifier also includes a harmonic terminating and impedance matching network that includes a number of sections coupled between the amplifier and the load resistance. A first section nearest the amplifier creates an impedance at the active output device, where the impedance is resonant with the output capacitance at a highest harmonic frequency and compensates for the output capacitance to produce a high impedance at the highest harmonic frequency. A second section nearest the load resistance creates an impedance at the active output device, where the impedance resonates with the output capacitance at a lowest harmonic frequency and compensates for the output capacitance to produce a high impedance at the lowest harmonic frequency.

In another implementation consistent with the present invention, a method is provided in a mobile terminal that includes an amplifier having an output capacitance. The method includes converting power from a DC power supply to RF power, via the amplifier. The method also includes creating a first impedance at an output of the amplifier, the first impedance resonating with the output capacitance at a first harmonic frequency and compensating for the output capacitance to produce a high impedance at the first harmonic frequency. The method further includes creating a second impedance at the output of the amplifier, the second impedance resonating with the output capacitance of the amplifier at a second harmonic frequency and compensating for the output capacitance to produce a high impedance at the second harmonic frequency.

In a further implementation consistent with the present invention, a class-F amplifier is provided. The amplifier includes an input that receives a sinusoidal drive signal. The amplifier also includes at least one active output device that receives the sinusoidal drive signal, where the active output device is forward-biased with a predetermined current. The amplifier further includes a harmonic network coupled to the active output device, where the harmonic network terminates odd harmonic frequencies to generate a substantially square wave output voltage signal waveform and a sinusoidal output current waveform.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION OF THE INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention enable an amplifier to operate at increased efficiency in a saturated regime. The amplifier may be coupled to a harmonic matching network that resonates the amplifier output capacitance at any given number of harmonic frequencies so that harmonic current flow is inhibited and harmonic voltages are not inhibited.

Figure 1:
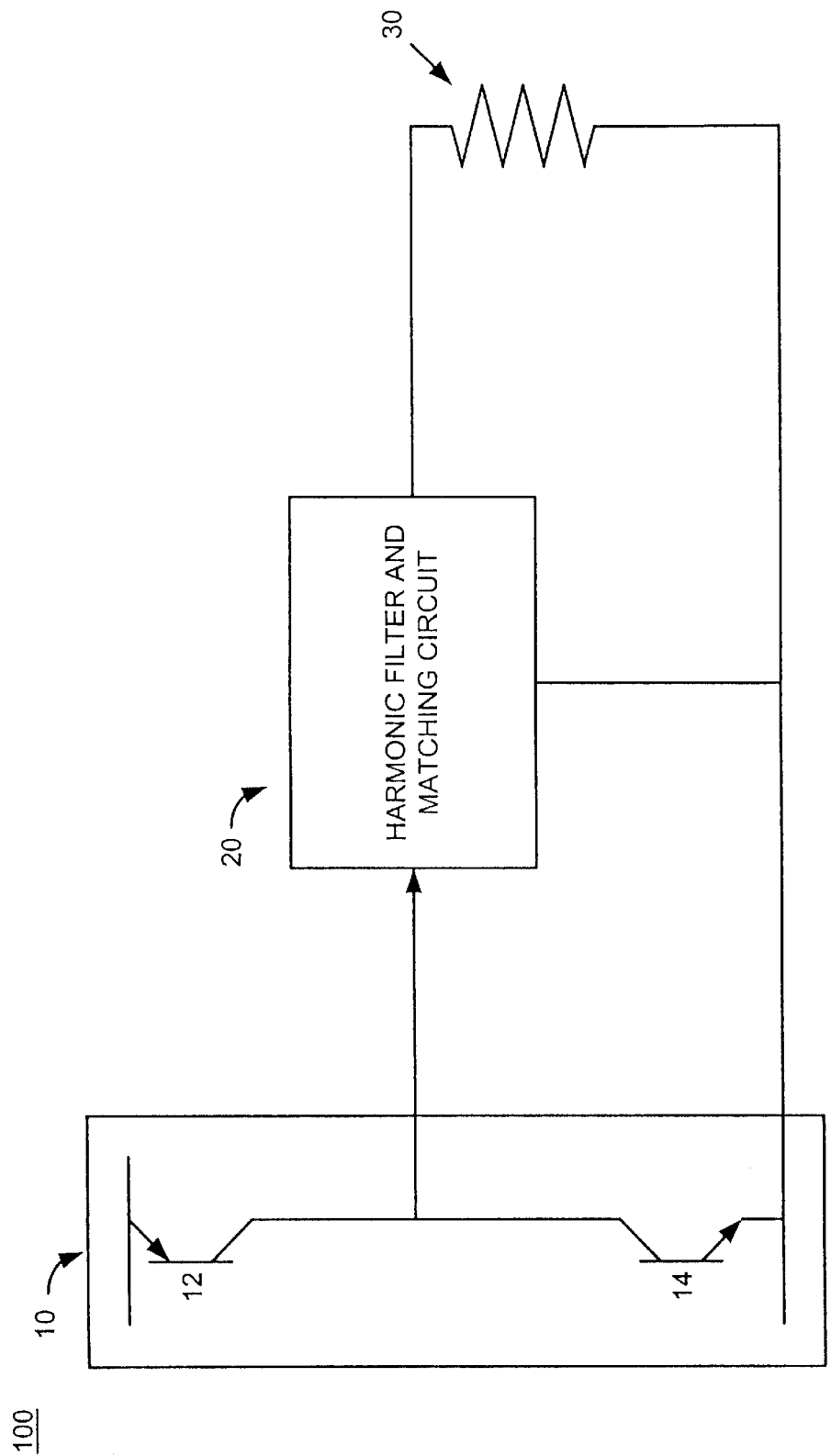
FIG. 1 is a diagram of an exemplary power amplifier system consistent with the present invention.

FIG. 1 is a diagram of a power amplifier system 100, consistent with the present invention. System 100 operates to convert power from a DC supply to RF power. The system 100 includes amplifier 10, harmonic filter and matching circuit 20 and load 30. The amplifier 10 includes active transistors 12 and 14 and is coupled to load 30 by the harmonic filter and matching circuit 20 (also referred to hereafter as the harmonic matching network). In accordance with the present invention, the harmonic filter and matching circuit 20 matches the load 30 to the amplifier 10 for the desired amount of power output and maximum efficiency by terminating the amplifier 10 with a desired impedance at various harmonic frequencies. The load 30 may represent, for example, a transmit antenna in a mobile terminal, such as a cellular telephone.

The configuration of components in amplifier 10 illustrated in FIG. 1 is for illustrative purposes only. One skilled in the art will recognize that other devices may be included in amplifier 10 and other configurations associated with amplifier 10 may be employed in implementations of the present invention.

For example, the amplifier 10 may include any number of other configurations for an amplifier used in a cellular application, such as cellular device employed in a U.S. AMPS analog FM system or the GSM digital cellular system. It should be understood that in the U.S. AMPS system, a duplexer (not shown) may be located between the transmitter and an antenna to allow simultaneous transmission and reception of RF signals. In such a case, the harmonic filter and matching circuit 20 may fix the harmonic impedance presented to the amplifier 10 irrespective of the load impedance 30, which may include the duplexer.

One type of amplifier that may be used in implementations of the present invention is a push-pull amplifier. A push-pull class-B amplifier is a type of linear amplifier that reproduces the input signal waveform at its output, up to the maximum linear output level, which is just before the onset of clipping. For a sinusoidal input waveform, the output voltage and current waveform are also sinusoidal at this point and the theoretical efficiency is $\pi/4$ or 78.5%. In implementations of the present invention, the theoretical efficiency of the amplifier may be higher than the class-B efficiency.

If the input signal level is increased beyond the level required to produce the maximum linear output signal, output clipping will occur and harmonics will be generated, as the output voltage waveform is no longer sinusoidal. Harmonic filters may be used to prevent harmonics from reaching the load, i.e., a transmit antenna.

A harmonic filter, consistent with the present invention, may be designed to not impede the output voltage waveform from ultimately attaining a near square-wave shape. For example, the fundamental signal current in one output device of a push-pull pair is drawn from the supply during the square-wave half-cycle when the voltage on the device is low, (i.e., close to zero). The fundamental current during the other half cycle comes from the other device of the push-pull pair, when its output voltage is close to zero. Such operation is known as class-F operation. By restricting current flow in the device to the low-voltage half-cycle, power wastage across the saturated device is minimized and efficiency is maximized. In this regime, i.e., beyond the onset of clipping, the power output will continue to rise with increasing drive level, as the fundamental frequency content of a square wave is $4/\pi$ times the peak voltage, or 2 dB higher than for a sinewave of the same peak voltage, and as a square waveform is approached, the theoretical efficiency approaches 100%.

A push-pull amplifier generates substantially only odd harmonics, i.e., $3f$, $5f$, $7f$, etc., which are also the only harmonics present in a symmetrical square-wave. Thus, the harmonic filter and matching circuit 20, consistent with the present invention, may attenuate odd harmonics by presenting a high impedance to the amplifier 10 at those harmonic frequencies. The impedance presented may be calculated to include the amplifier's 10 own shunt output capacitance, which normally presents a low impedance at harmonic frequencies.

The present invention, as described in detail below, provides a design procedure to determine values of components forming the harmonic filter and matching circuit 20 to present an inductive impedance to the amplifier 10 at chosen harmonic frequencies. The inductive impedance of the circuit 20 may be designed so that it resonates with the amplifier's output capacitance at the chosen harmonic frequencies.

With regard to a push-pull amplifier, the present invention may also define termination impedances for the common mode as well as the push-pull mode, also known as even and odd modes, respectively. If the push-pull amplifier is perfectly symmetric, the even mode signals include only even harmonics and the odd mode signals include only odd harmonics. Thus, it may only be necessary to define termination impedances in the odd mode at odd harmonic frequencies. In alternative implementations of the present invention, even mode impedances may be designed to be high at even harmonics, in contrast with defining odd mode impedances to be low at even harmonics. This may be accomplished using an even-mode, even-harmonic resonating network (e.g., connected to the center tap of a push-pull output transformer) designed in accordance with the present invention.

A non-push-pull amplifier, i.e., a single-ended amplifier, is another type of amplifier that may be used in accordance with the present invention. A non-push-pull amplifier may be forced to generate the same output waveform, which exhibits plus/minus symmetry, as a push-pull amplifier by forcing even harmonic content of the output waveform at the amplifier to be zero, using second harmonic short-circuit traps. Thus, for a single-ended amplifier, low or zero impedance terminations at even harmonics may be useful. This may be achieved by connecting a short circuit stub that is one quarter wavelength long at the fundamental frequency to the amplifier's output, thereby providing a short circuit termination at even harmonics and an open circuit at odd harmonics. However, the open circuit at odd harmonics does not compensate for amplifier capacitance and has no effect relative to the present invention. Implementations of the present invention, therefore, may produce open circuits at the odd harmonics that compensate for amplifier capacitance and ignore even harmonic requirements, which may be satisfied by the above-mentioned quarterwave stub trap.

Yet another amplifier configuration that may be employed in implementations of the present invention is a single-ended push-pull amplifier. The single-ended push-pull amplifier uses one active device to pull the load voltage up and another active device alternately to pull the load voltage down. The single-ended push-pull amplifier does not need a balun and does not have an even mode with which to be concerned. A pair of single-ended push-pull amplifiers may be operated in anti-phase to drive a balanced load in a configuration known as a bridge configuration. Although a bridge configuration does have an even mode, no even mode signal may be generated if the bridge is symmetrical, thereby eliminating concern with how the even mode is terminated. Therefore, the present invention may be used to determine odd-mode, odd-harmonic terminations, resulting in the desired efficiency.

In summary, and as described in detail below, implementations of the present invention may be used to increase the efficiency of DC to RF power conversion for a number of different types of amplifiers. In each case, a harmonic matching network resonates the amplifier's output capacitance at any given number of harmonic frequencies so that harmonic current flow is inhibited and harmonic voltages are not inhibited.

Figure 2:
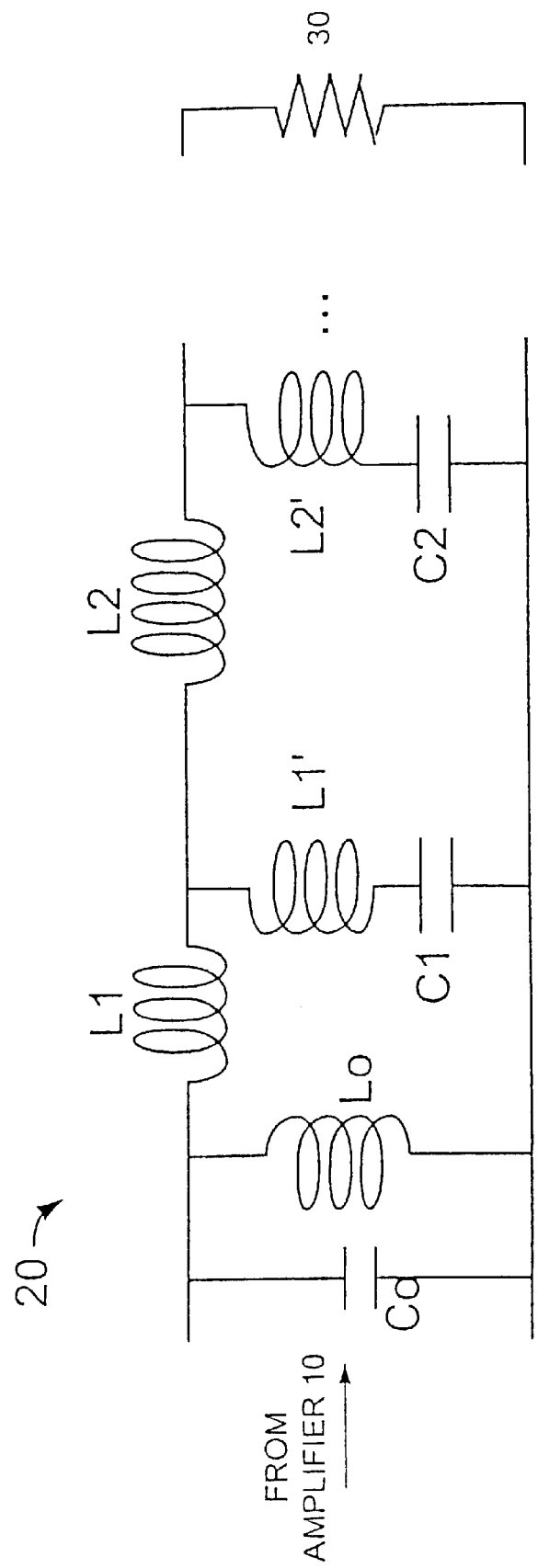
FIG. 2 is a diagram of an exemplary harmonic filter and matching circuit of FIG. 1, according to an implementation consistent with the present invention.

FIG. 2 illustrates an exemplary harmonic filter and matching circuit 20 consistent with an implementation of the present invention. The circuit 20 represents an exemplary discrete L-C network implementation and includes capacitors Co, C1 and C2 and inductors Lo, L1, L1', L2 and L2'. Capacitor Co represents the output capacitance of amplifier 10. The inductor Lo may represent a supply feed choke, when amplifier 10 is a single ended amplifier, or the primary of a balanced to unbalanced transformer, when amplifier 10 is a push-pull amplifier. The inductor Lo may be connected in parallel to the output capacitance Co to resonate the output capacitance Co at the fundamental frequency $w_0$.

Capacitor C1 is connected in series with inductor L' and represents a harmonic trap. Capacitor C2 is connected in series with inductor L2' and also represents a harmonic trap. The harmonic traps may be connected to ground at points between the amplifier 10 and load 30. Inductors L1 and L2 are connected in series with the amplifier's 10 output. In an exemplary implementation of the present invention, the harmonic trap including C1 shorts inductor L1 to ground at the highest harmonic frequency. Inductor L1 thus appears as a shunt inductor at the harmonic frequency, resonating the output capacitance Co to present a high impedance to the output devices of the amplifier 10 at the highest chosen harmonic. The harmonic trap impedance, which depends on C1, may be selected such that a resistive load at the fundamental frequency, for the network 20 constructed at this point, transforms to the desired resistive load at the amplifier's 10 output for generating the desired output power.

The harmonic trap including C2, consistent with the present invention, shorts inductor L2 at a next lower odd harmonic frequency than the highest harmonic frequency being considered, e.g., $(N-2)w_0$, and, in conjunction with the network already between it and the output devices of amplifier 10, may result in a high impedance being seen by the output devices at the next lower odd harmonic, as described in more detail below. This further harmonic trap impedance may then be selected to preserve the desired resistive load at the amplifier 10 at the fundamental frequency when a certain resistive load is connected to the output of the network.

Additional series inductors L3, L4, etc. (not shown) and harmonic traps using C3, C4, etc. (not shown) may be added until all desired odd harmonics have been resonated to a high impedance at the active devices while matching the load at the fundamental frequency to a resistive impedance. The final harmonic trap may be tuned to the lowest odd harmonic frequency, e.g., 3rd harmonic.

Figure 3:
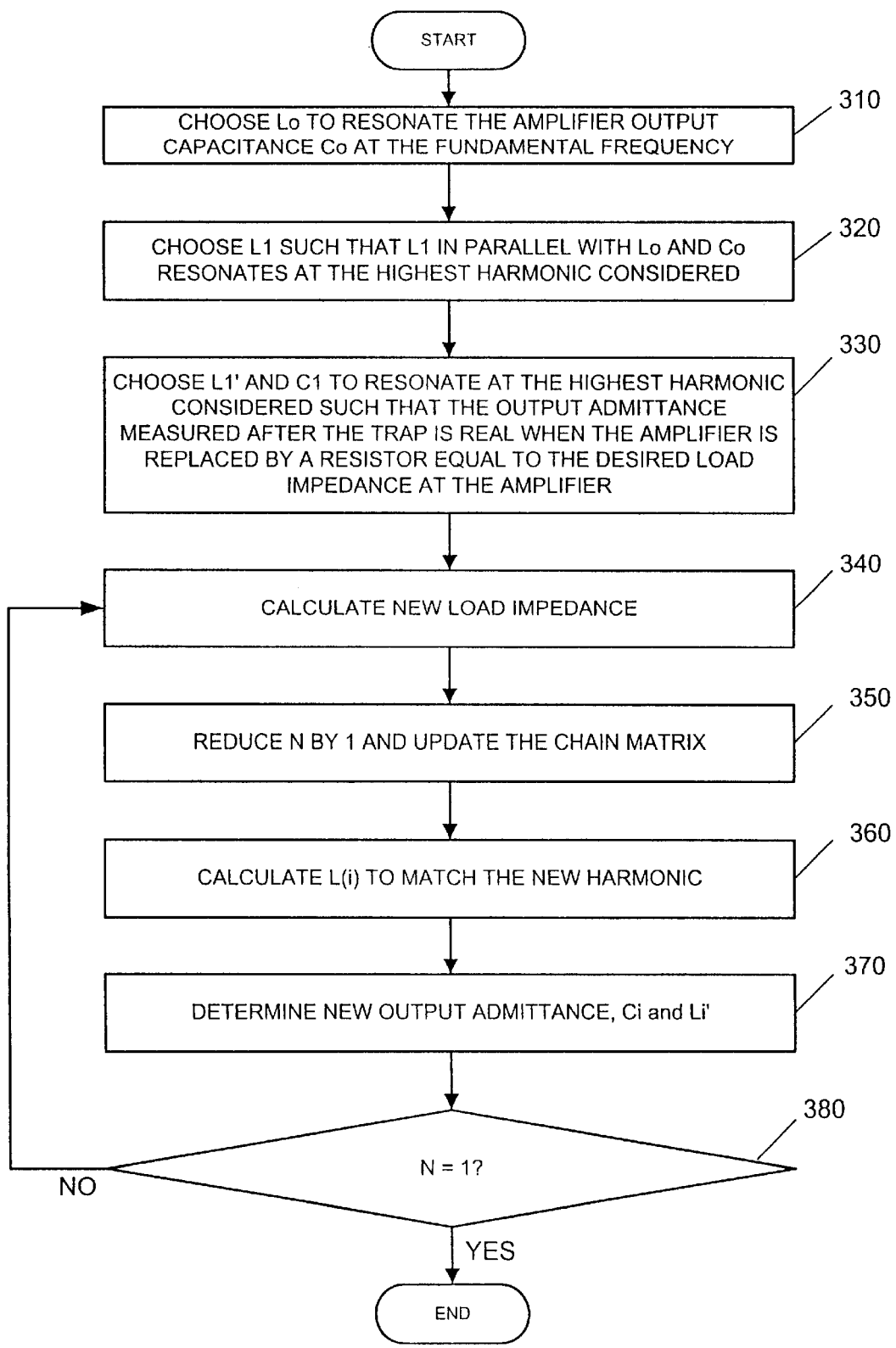
FIG. 3 is a flow diagram illustrating exemplary processing for designing the circuit of FIG. 2, consistent with the present invention.

FIG. 3 is a flow diagram, consistent with the present invention, illustrating an exemplary procedure for designing the discrete component network of FIG. 2. The procedure begins by choosing Lo to resonate the amplifier's 10 output capacitance Co at the fundamental frequency $w_0$ using the following equation [step 310]:

$$Lo = \frac{1}{w_o^2 Co}$$

This step aids in achieving high efficiency and widest operating bandwidth.

L1 may then be chosen such that L1 in parallel with Lo and Co resonates at the highest harmonic being considered [step 320]. For example, suppose the highest harmonic being considered is the odd harmonic $(2N+1)w_0$; then $$L = \frac{1}{[(2N+1)w_o]^2 Co} \text{ and}$$

$$L1 = \frac{(Lo)(L)}{(Lo - L)}$$

Next, L1' and C1 may be chosen to resonate at the above harmonic frequency, i.e., $(2N+1)w_0$, and such that the output admittance measured after the trap including L1' and C1 is real when the amplifier 10 is replaced by a resistor equal to the desired load impedance at the amplifier 10 [step 330]. For example, a procedure consistent with the present invention for calculating L1' and C1 begins by computing a chain matrix at the fundamental frequency $w_0$ for the network, i.e., the circuit 20, from the amplifier 10 to the point at which L1' and C1 are connected, from equation (1) below:

$$\begin{pmatrix} a11 & a12 \\ a21 & a22 \end{pmatrix} = \begin{pmatrix} 1 & jw_0 L1 \\ 0 & 1 \end{pmatrix} \qquad \text{Equ. (1)}$$

The output admittance when the amplifier 10 is replaced with its desired load $R_L$ may then be given by:

$$Y = \frac{(a21)(R_L) + a22}{(a22)(R_L) + a11}$$

The imaginary part of Y (output susceptance) may then be cancelled by choosing C1 using:

$$C1 = IMAG(Y)\left(\frac{1 - \frac{1}{(2N+1)^2}}{w_o}\right)$$

-continued then $$Li' = \frac{1}{[(2N+1)w_o]^2 Ci}$$

The values of subsequent component values, such as L2, C2 and L2' may then be determined by iterating the procedure illustrated below, which is described in terms of Li, Ci and Li'.

For example, an exemplary procedure consistent with the present invention for determining subsequent component values may begin by calculating the new load impedance $R_L$ after adding the trap calculated in step 330 to be $R_L$(new)= 1/REAL(Y) [step 340]. Next, reduce N by 1 using N=N−1 to get the harmonic number of the next lower odd harmonic to be matched [step 350]. The chain matrix of the network at this point at the next lower harmonic to be matched may be updated using equation (2) below [step 350].

$$\begin{pmatrix} a11 & a12 \\ a21 & a22 \end{pmatrix}_{next} = \begin{pmatrix} a11 & a12 \\ a21 & a22 \end{pmatrix}_{previous} \times \qquad \text{Equ. (2)}$$

$$\begin{pmatrix} 1 & j(2N+1)w_oL(i-1) \\ 0 & 1 \end{pmatrix} \times \begin{pmatrix} 1 & 0 \\ \frac{j(2N+1)w_oC(i-1)}{1-\left(\frac{2N+1}{2N+3}\right)^2} & 1 \end{pmatrix}$$

where the "previous" chain matrix in equation (2) was also computed at the new harmonic number (2N+1), with N having been reduced by 1 as above. In addition, the initial value of the chain matrix at harmonic number (2N+1), before the first application of equation (2) is given by Co in parallel with Lo as:

$$\begin{pmatrix} 1 & 0 \\ \frac{j(2N+1)w_oCo}{1-\frac{1}{(2N+1)^2}} & 1 \end{pmatrix}$$

Li may then be calculated to match the new harmonic (2N+1) [step 360] from:

$$Li = \frac{REAL(a22)}{((2N+1)w_o)(IMAG(a21))},$$

where a22, a21 refer to the harmonic values calculated using equation (2).

Next, determine the new output admittance at the fundamental frequency [step 370] using:

$$Y = \frac{1}{R_L + jw_oLi},$$

where $R_L$ is the new load resistance determined in step 340. Ci and Li' may then be calculated [step 370] using:

$$Ci = IMAG(Y) \left( \frac{1 - \frac{1}{(2N+1)^2}}{w_o} \right)$$

and

-continued $$Li' = \frac{1}{[(2N+1)w_o]^2 Ci}$$

Next, determine if the last harmonic matched is the third harmonic, i.e., with N=1 [step 380]. If the last harmonic is the third harmonic the procedure ends. If not, the procedure returns to step 340.

Figure 4:
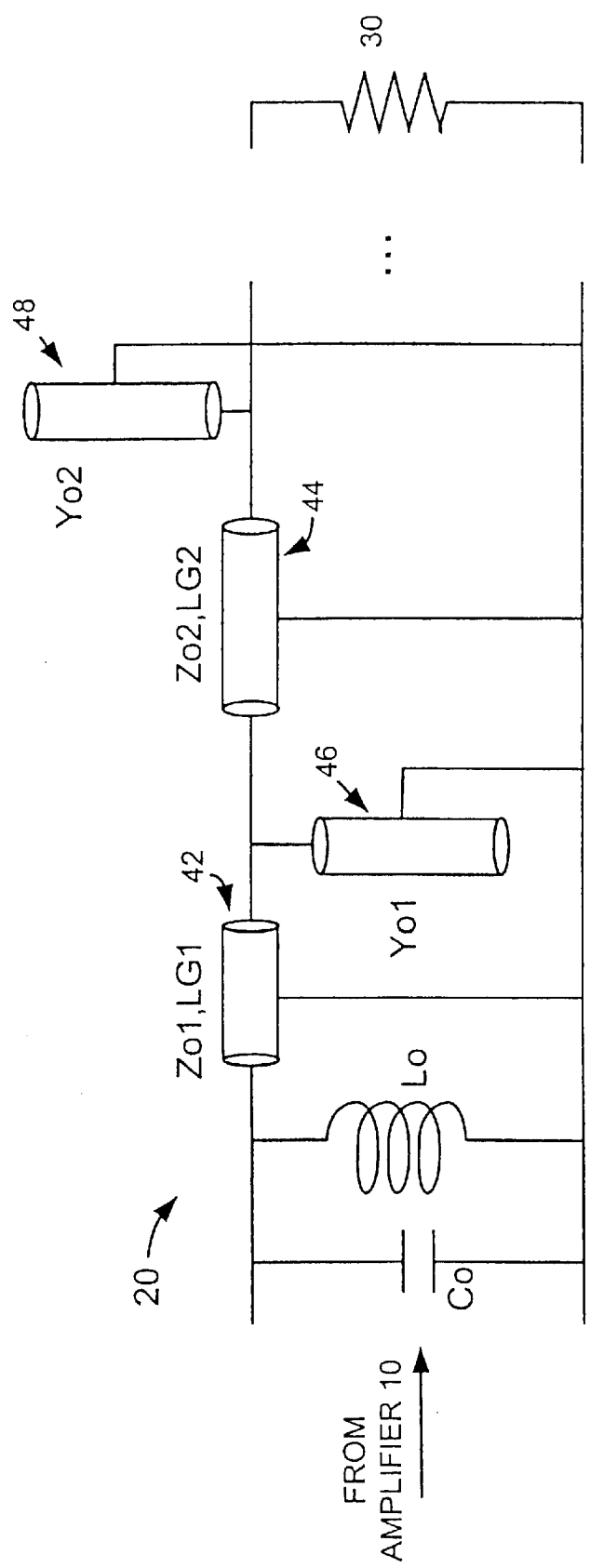
FIG. 4 is a diagram of an exemplary harmonic filter and matching circuit of FIG. 1, according to an alternative implementation consistent with the present invention.

FIG. 4 illustrates an exemplary filter and matching circuit 20 consistent with another implementation of the present invention. The circuit 20 represents a fully distributed implementation employing transmission lines and includes capacitor Co, inductor Lo, and transmission lines 42, 44, 46 and 48. Similar to the previous discussion regarding FIG. 2, the capacitor Co represents the amplifier's 10 output capacitance and the inductor Lo may represent a supply feed choke for a single-ended amplifier or the primary of a balanced to unbalanced transformer in the case of a conventional push-pull amplifier.

The transmission lines 42 and 44 are connected in series and connect the amplifier 10 with the load 30. Transmission lines 42 and 44 have characteristic impedance Zo1 and Zo2 and lengths LG1 and LG2, respectively. Transmission line 46 represents a stub trap having a characteristic admittance Yo1 and a length of one quarter wavelength at the highest harmonic frequency being considered. Transmission line 48 represents another stub trap having a characteristic admittance of Yo2 and a length of one quarter wavelength at the second highest harmonic frequency being considered. In order to compensate for device capacitance Co, transmission lines 46 and 48 may be connected progressively nearer the amplifier 10 for progressively higher harmonic frequencies, thereby allowing the effective distance from the amplifier 10 to be shortened for each harmonic, thereby achieving compensation for device output capacitance Co for every harmonic frequency.

Additional series transmission lines (not shown) and stub traps (not shown) may be added until all desired odd harmonics have been resonated to a high impedance at the active devices while matching the load at the fundamental frequency to a resistive impedance.

Figure 5:
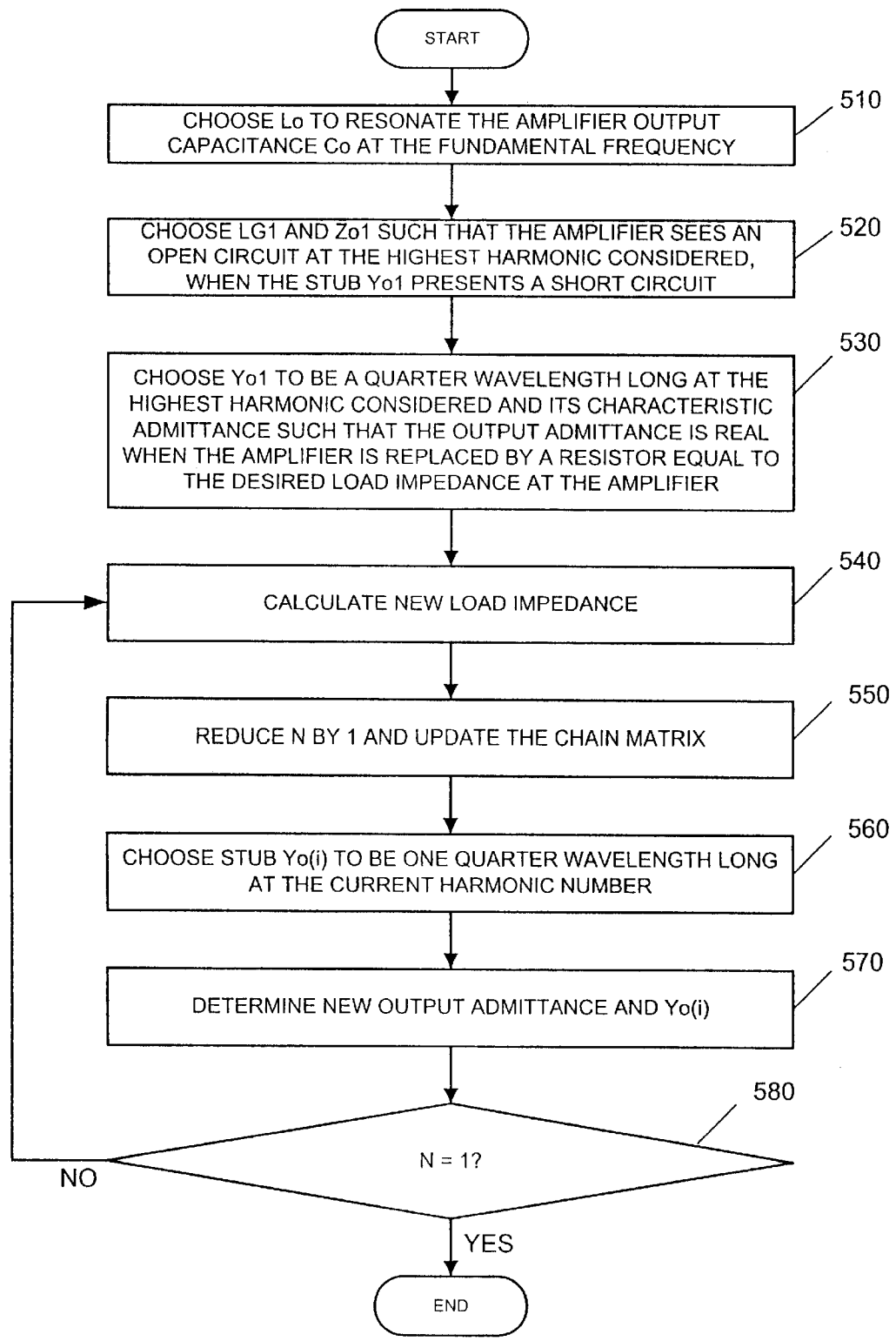
FIG. 5 is a flow diagram illustrating exemplary processing for designing the circuit of FIG. 4, consistent with the present invention.

FIG. 5 is a flow diagram, consistent with the present invention, illustrating an exemplary design procedure for designing the distributed component network of FIG. 4. The procedure begins by choosing Lo to resonate the amplifier output capacitance Co at the fundamental frequency $w_0$ using the following equation [step 510]:

$$Lo = \frac{1}{w_0^2 Co}$$

The characteristic impedance Zo1 and length LG1 of transmission line 42 may then be chosen such that, at the highest harmonic considered, $(2N+1)w_0$, when stub Yo1 presents a short circuit, the amplifier 10 sees an open circuit [step 520]. This condition requires that:

$$\frac{1}{Zo1} = \left( (2N+1)w_oCo - \frac{1}{(2N+1)w_0Lo} \right) \tan\left[ (2N+1)w_0 \frac{LG1}{c} \right]$$

where "c" represents the speed of light. LG1 may then be calculated for a given value of Zo1. One condition on Zo1 is that it may be greater than the value of the real load resistance the amplifier 10 requires for the given power output. In the limit, a very high Zo1 leads to a very small LG1 and transmission line 42 asymptotes to equivalence with the series inductor L1 illustrated in FIG. 2. Within this constraint, Zo1 may be freely chosen.

Stub Yo1 may then be chosen to a quarter wavelength long at the above harmonic frequency, $(2N+1)w_o$, and its characteristic admittance such that the output admittance measured after the stub Yo1 is real when the amplifier 10 is replaced by a resistor equal to the desired load impedance at the amplifier 10 [step 530].

For example, a procedure consistent with the present invention for calculating Yo1 begins by computing a chain matrix at the fundamental frequency $w_0$ for the network from the amplifier 10 to the point at which Yo1 is connected, from equation (3) below:

$$\begin{pmatrix} a11 & a12 \\ a21 & a22 \end{pmatrix} = \begin{pmatrix} \cos\left(\frac{w_o LG1}{c}\right) & jZo1\text{SIN}\left(\frac{w_o LG1}{c}\right) \\ \frac{j\text{SIN}(w_o LG1/c)}{Zo1} & \cos\left(\frac{w_o LG1}{c}\right) \end{pmatrix} \quad \text{Equ. (3)}$$

The output admittance when the amplifier 10 is replaced with its desired load $R_L$ may then be given by:

$$Y = \frac{(a21)(R_L) + a12}{(a22)(R_L) + a11}$$

The imaginary part of Y (output susceptance) may then be cancelled by choosing Yo1 using:

$$Yo1 = IMAG(Y)\cot\left[\frac{\pi}{4N+2}\right]$$

The values of subsequent components, such as LG2, Yo2, etc., may then be determined by iterating the procedure described below, which is described in terms of $Zo(i)$, $LG(i)$ and $Yo(i)$.

For example, an exemplary procedure consistent with the present invention for determining subsequent component values may begin by calculating the new load impedance $R_L$ after adding the trap calculated in step 530 to be $R_L(\text{new}) = 1/\text{REAL}(Y)$ [step 540]. Next, reduce N by 1 using $N = N-1$ to get the harmonic number of the next lower odd harmonic to be matched [step 550]. The chain matrix of the network at this point at the next lower harmonic to be matched, may then be updated from equation (4) below [step 550].

$$\begin{pmatrix} a11 & a12 \\ a21 & a22 \end{pmatrix}_{next} = \begin{pmatrix} a11 & a12 \\ a21 & a22 \end{pmatrix}_{previous} \times \quad \text{Equ. (4)}$$

$$\begin{pmatrix} \cos\left[(2N+1)w_0\frac{LG1}{c}\right] & jZo(i)\text{SIN}\left[(2N+1)w_0\frac{LG1}{c}\right] \\ \frac{j\text{SIN}\left[(2N+1)w_0\frac{LG1}{c}\right]}{Zo(i)} & \cos\left[(2N+1)w_0\frac{LG1}{c}\right] \end{pmatrix} \times$$

$$\begin{pmatrix} 1 & 0 \\ jYo(i)\tan\left[\pi\frac{(2N+1)}{(2N+3)}\right] & 1 \end{pmatrix}$$

where the "previous" chain matrix in equation (4) was also computed at the new harmonic number $(2N+1)$, with N having been reduced by 1 as above, and the initial value of the chain matrix at harmonic number $(2N+1)$, before the first application of equation (4) is given by Co in parallel with Lo as:

$$\begin{pmatrix} 1 & 0 \\ j(2N+1)w_0 Co & 1 \\ 1 - \frac{1}{(2N+1)^2} & \end{pmatrix}$$

Stub $Yo(i)$ may then be chosen to be one quarter wavelength long at the current harmonic number $2N+1$ [step 560]. The new output admittance may then be calculated at the fundamental frequency [step 570] from:

$$Y = \frac{Zo(i)\cos\left(\frac{w_0 LG(i)}{c}\right) + jR_L\text{SIN}\frac{w_0 LG(i)}{c}}{Zo(i)\left(R_L\cos\left(\frac{w_0 LG(i)}{c}\right) + jZo(i)\text{SIN}\left(\frac{w_0 LG(i)}{c}\right)\right)}$$

where $R_L$ is the new load resistance determined in step 540. $Yo(i)$ may then be calculated [step 570] using:

$$Yo(i) = IMAG(Y)\left(\cot\left[\frac{(2N-1)\pi}{(4N+2)}\right]\right)$$

Next, determine if the last harmonic matched is the third harmonic, i.e., with $N=1$ [step 580]. If the last harmonic is the third harmonic, the procedure ends. If not, the procedure returns to step 540.

Alternative implementations of the present invention may combine elements of the discrete network implementation of FIG. 2 with the distributed component implementation of FIG. 4. For example, the transmission lines between the amplifier and the load in FIG. 4 may be replaced with a string of series-connected inductors, as in FIG. 2, while retaining the transmission line stub traps. Alternatively, the transmission line stub traps may be replaced with discrete LC traps while retaining the transmission line connecting the amplifier to the load.

Figure 6:
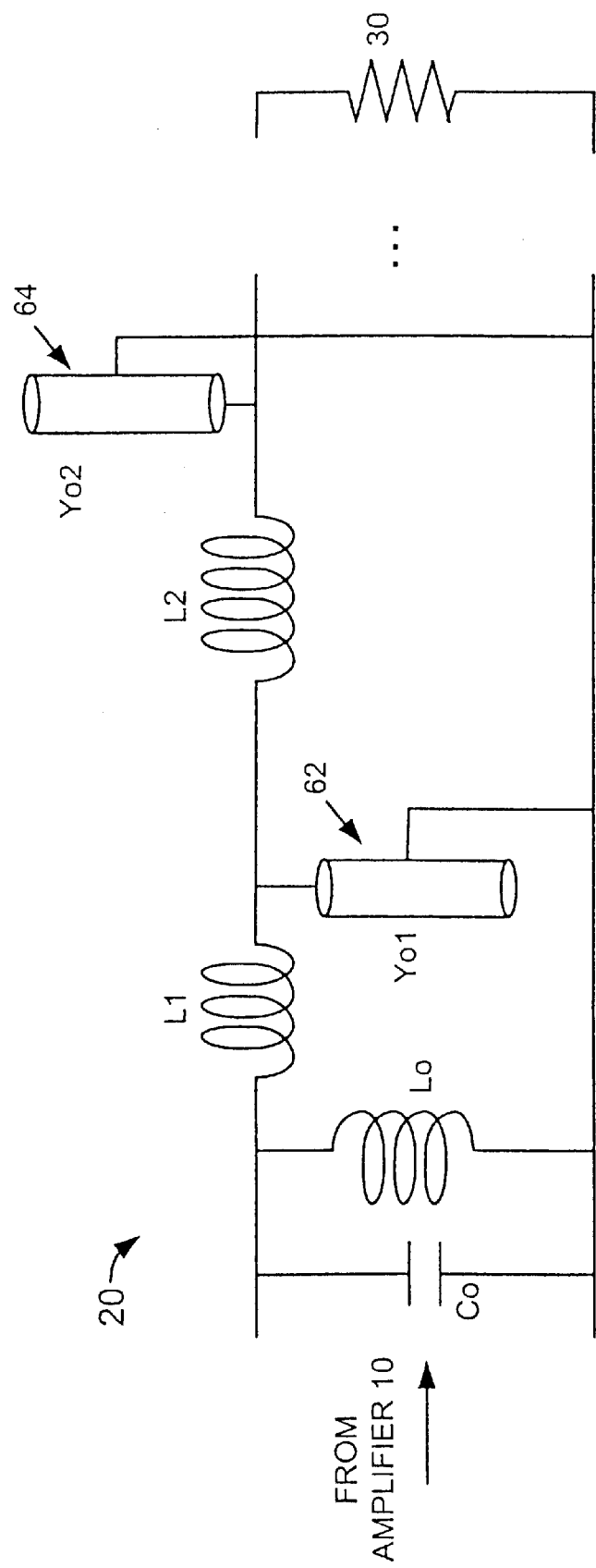
FIG. 6 is a diagram of an exemplary harmonic filter and matching circuit of FIG. 1, according to another alternative implementation consistent with the present invention.

FIG. 6 illustrates an exemplary hybrid discrete/distributed harmonic matching network 20 consistent with an alternative implementation of the present invention. The network 20 includes capacitor Co and inductors Lo, L1 and L2 and transmission lines 62 and 64. Similar to the previous discussion regarding FIG. 2, the capacitor Co represents the output capacitance of amplifier 10 and inductor Lo may represent a supply feed choke for a single-ended amplifier or the primary of a balanced to unbalanced transformer in the case of a conventional push-pull amplifier.

The network 20 includes inductors L1 and L2 instead of the transmission lines 42 and 44 of FIG. 4. The network 20 also includes transmission line stub traps 62 and 64, similar to those used in FIG. 4.

Additional series inductors L3, L4, etc. (not shown) and transmission lines stub traps (not shown) may be added until all desired odd harmonics have been resonated to a high impedance at the active devices while matching the load at the fundamental frequency to a resistive impedance.

In the hybrid network 20, the impedance presented to the amplifier 10 at the highest harmonic frequency is determined by the components nearest the amplifier 10, thereby preventing components further away from the amplifier 10 from having an effect at that harmonic. Conversely, the components further away from the amplifier 10 determine the impedance seen by the amplifier 10 at lower harmonic frequencies, as the components in between reject higher harmonics, but pass through the lower harmonics.

Figure 7:
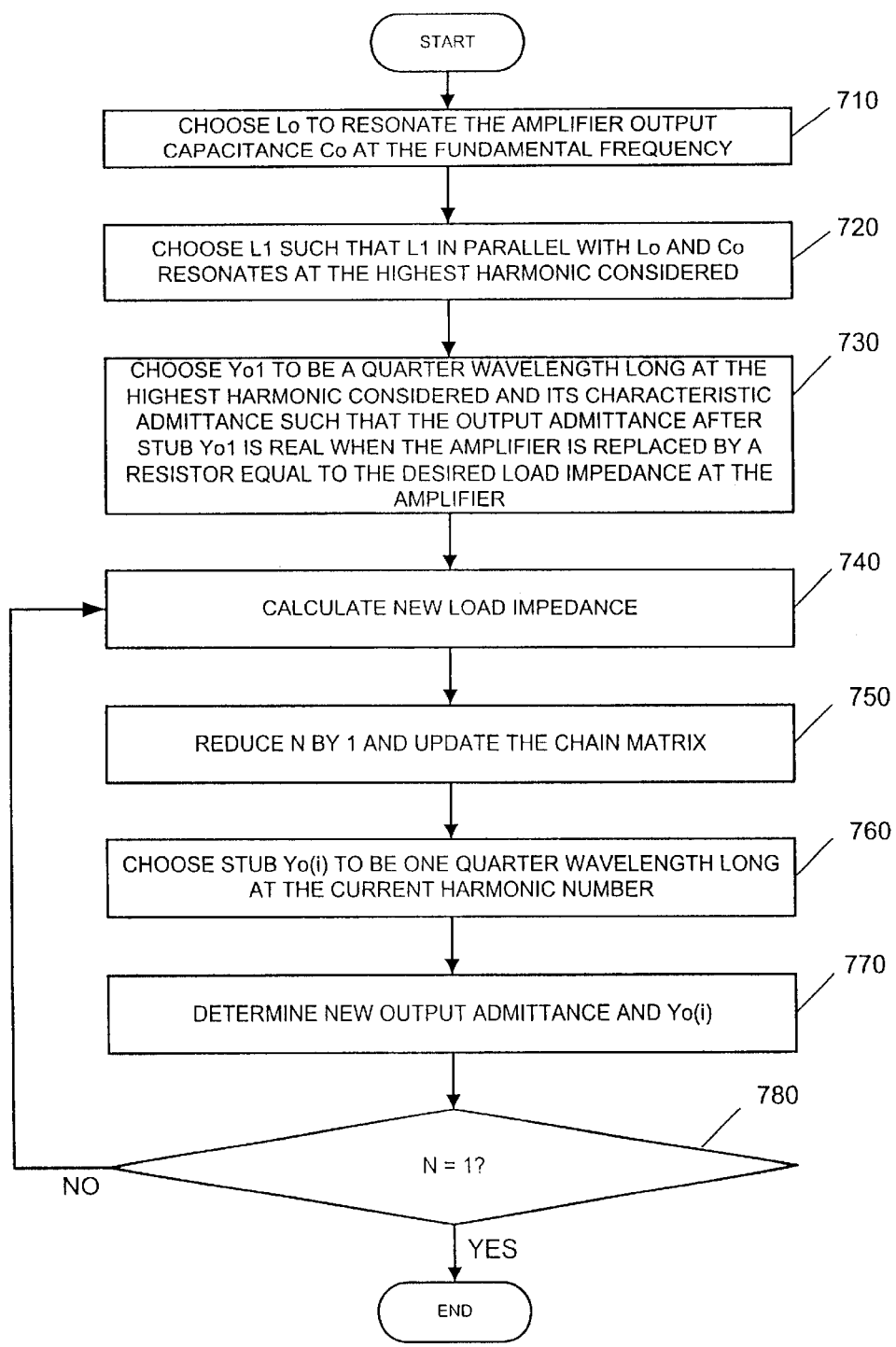
FIG. 7 is a flow diagram illustrating exemplary processing for designing the circuit of FIG. 6, consistent with the present invention.

FIG. 7 is a flow diagram, consistent with the present invention, illustrating an exemplary design procedure for designing the hybrid component network 20 of FIG. 6. The procedure begins by choosing Lo to resonate the amplifier output capacitance Co at the fundamental frequency $w_0$ using the following equation [step 710]:

$$Lo = \frac{1}{w_0^2 Co}$$

L1 may then be chosen such that L1 in parallel with Lo and Co resonates at the highest harmonic being considered [step 720]. For example, suppose the highest harmonic being considered is the odd harmonic $(2N+1)w_0$; then $$L = \frac{1}{[(2N+1)w_0]^2 Co} \text{ and}$$

$$L1 = \frac{(Lo)(L)}{(Lo-L)}$$

Next, stub Yo1 may be chosen to be one quarter wavelength long at the above harmonic frequency $(2N+1)w_0$, and its characteristic admittance such that the output admittance measured after the stub Yo1 is real when the amplifier 10 is replaced by a resistor equal to the desired load impedance at the amplifier 10 [step 730]. For example, a procedure consistent with the present for calculating Yo1 begins by computing a chain matrix at the fundamental frequency $w_0$ for the network from the amplifier 10 to the point at which Yo1 is connected, from:

$$\begin{pmatrix} a11 & a12 \\ a21 & a22 \end{pmatrix} = \begin{pmatrix} 1 & jw_0 L1 \\ 0 & 1 \end{pmatrix}$$

The output admittance when the amplifier 10 is replaced with its desired load $R_L$ may then be given by:

$$Y = \frac{(a21)(R_L) + a12}{(a22)(R_L) + a11}$$

The imaginary part of Y (output susceptance) may then be cancelled by choosing Yo1 using:

$$Yo1 = IMAG(Y)\cot\left[\frac{\pi}{4N+2}\right]$$

The values of subsequent components, such as L2, Yo2, etc., may then be determined by iterating the procedure illustrated below, which is described in terms of Li and Yo(i).

For example, an exemplary procedure consistent with the present invention for determining subsequent component values may begin by calculating the new load impedance $R_L$ after adding the trap calculated in step 730 to be $R_L(new)=$ 1REAL(Y) [step 740]. Next, reduce N by 1 using N=N−1 to get the harmonic number of the next lower odd harmonic to be matched [step 750]. The chain matrix of the network at this point at the next lower harmonic to be matched may then be updated from equation (5) below [step 750].

$$\begin{pmatrix} a11 & a12 \\ a21 & a22 \end{pmatrix}_{next} = \begin{pmatrix} a11 & a12 \\ a21 & a22 \end{pmatrix}_{previous} \times \quad \text{Equ. (5)}$$

-continued $$\begin{pmatrix} 1 & j(2N+1)w_0 L(i-1) \\ 0 & 1 \end{pmatrix} \times \begin{pmatrix} 1 & 0 \\ jYo(i)\tan\left[\pi\left(\frac{(2N+1)}{(2N+3)}\right)\right] & 1 \end{pmatrix}$$

where the "previous" chain matrix in equation (5) was also computed at the new harmonic number (2N+1), with N having been reduced by 1 as above, and the initial value of the chain matrix at harmonic number (2N+1), before the first application of equation (5) is given by Co in parallel with Lo as:

$$\begin{pmatrix} 1 & 0 \\ j(2N+1)w_0 Co & 1 \\ 1 - \frac{1}{(2N+1)^2} & \end{pmatrix}$$

Stub Yo(i) may then be chosen to be one quarter wavelength long at the current harmonic number 2N+1 [step 760]. The output admittance at the fundamental frequency may then be calculated [step 770] from:

$$Y = \frac{1}{R_L + jw_0 Li},$$

where $R_L$ is the new load resistance determined in step 740. Yo(i) may then be calculated [step 770] using:

$$Yo(i) = IMAG(Y)\cot\left[\frac{(2N-1)\pi}{(4N+2)}\right]$$

Next, determine if the last harmonic matched is the third harmonic, i.e., with N=1 [step 780]. If the last harmonic is the third harmonic, the procedure ends. If not, the procedure returns to step 740.

In another implementation of the present invention, the fully distributed design procedure described in relation to FIGS. 4 and 5 may be used for the highest harmonics, for which the line lengths close to the amplifier 10 would be small and the network 20 compact. The design procedure may then switch to the discrete component iteration described in relation to FIGS. 2 and 3 for lower harmonic frequencies where line lengths would be longer and discrete components therefore more compact.

Figure 8:
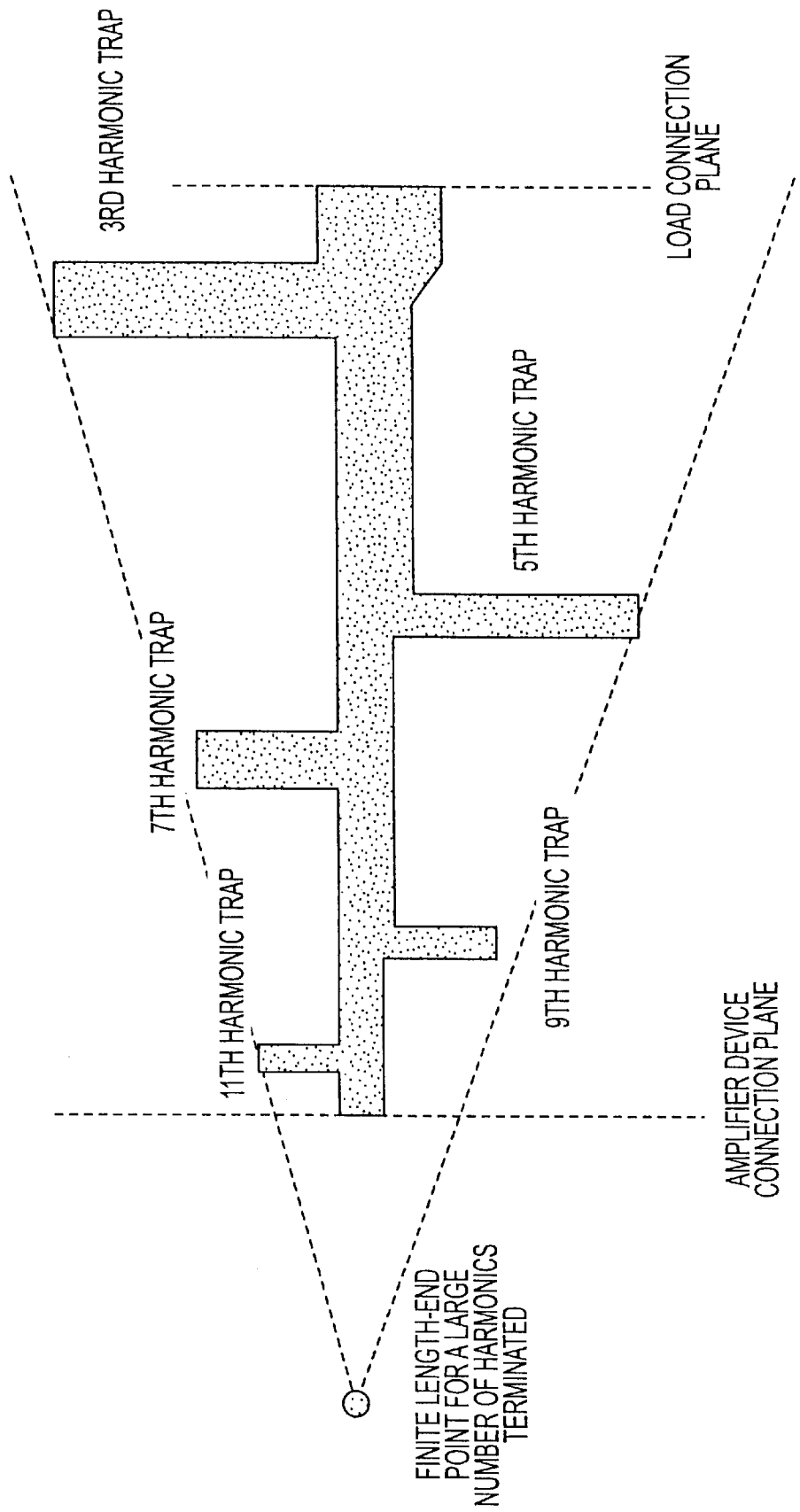
FIG. 8 illustrates an exemplary stripline pattern for an odd-harmonic terminating network, consistent with the present invention.

FIG. 8 illustrates a stripline pattern for an odd harmonic distributed component network 20, consistent with an implementation of the present invention. It should be noted that FIG. 8 is not to scale and the network 20 is in practice more compressed in the horizontal direction. For that reason, to avoid adjacent traps coupling, the traps may be oriented alternately up and down. Due to the diminishing size of the harmonic traps and their displacement for increasingly higher harmonic frequencies, as illustrated in FIG. 8, the total size of the network 20 tends not to grow significantly if the order of the network is increased to handle many higher harmonics.

The size of the network 20 in FIG. 8 is dominated by the length of the trap designed to handle the third harmonic. For a 2 GHz amplifier with a 6 GHz 3rd harmonic, for example, the third harmonic trap length may be of the order of 4 mm on a Gallium-Arsenide (GaAs) substrate with an effective dielectric constant of 10.

Figure 9:
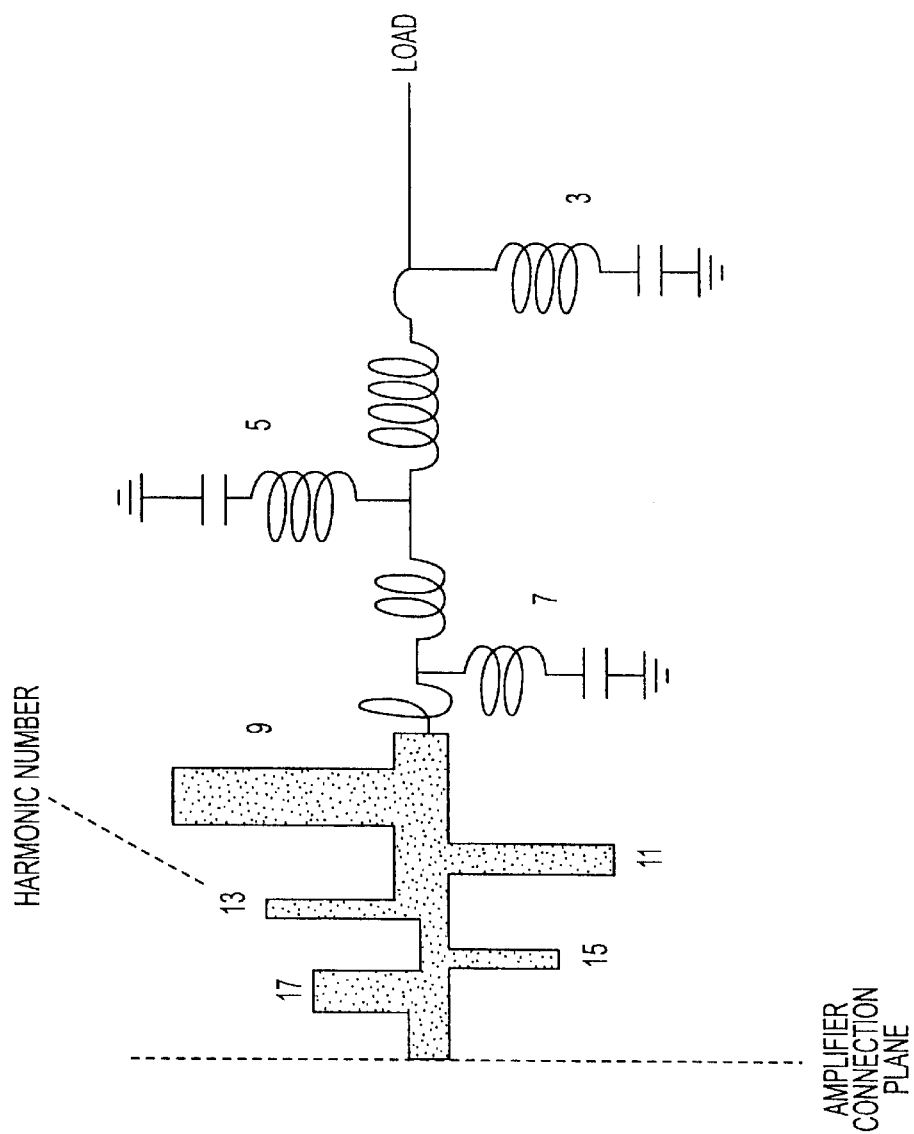
FIG. 9 illustrates an exemplary hybrid discrete/distributed harmonic terminating circuit, consistent with the present invention.

FIG. 9 illustrates another alternative hybrid distributed/discrete component circuit consistent with an implementation of the present invention. It is seen that discrete components are used for the lower harmonics, e.g., harmonics 3, 5 and 7, to reduce size. The longest stub trap, as illustrated in FIG. 9, is associated with the 9th harmonic and may be about 1.3 mm long.

Figure 10B:
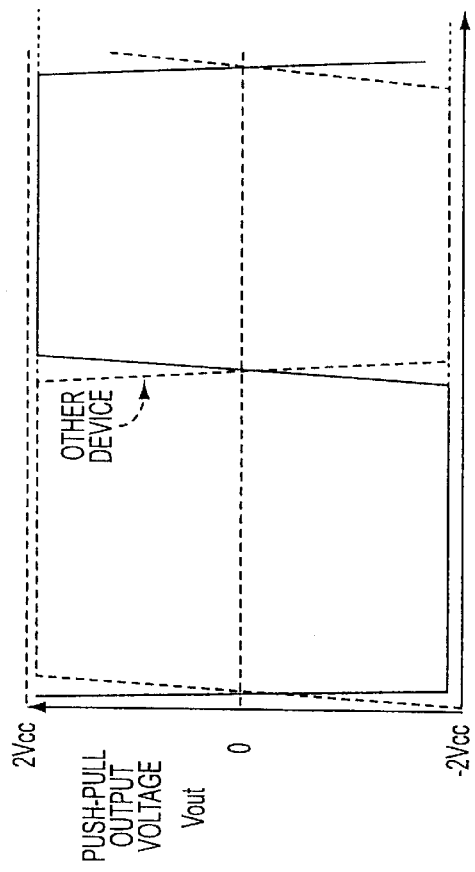
FIGS. 10A–10C illustrate an exemplary class-F amplifier and corresponding output voltage and current waveforms, consistent with the present invention.
Figure 10C:
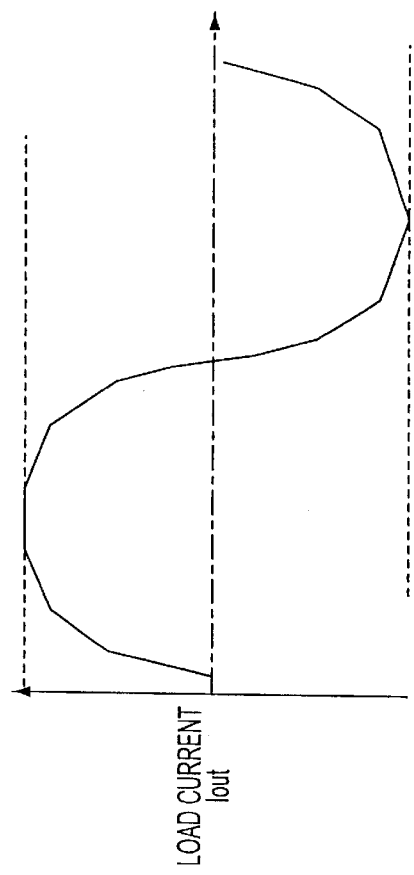
Figure 10A:
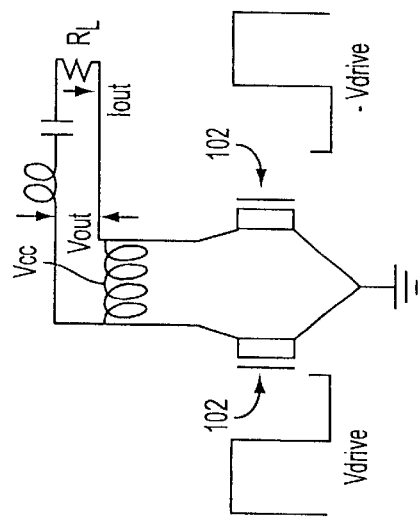

FIGS. 10A–10C illustrate a class-F amplifier (FIG. 10A), an output voltage waveform (FIG. 10B) and a theoretical current waveform (FIG. 10C) for the class-F amplifier. The output current from the active semiconductor devices 102 and 104 illustrated in FIG. 10A may be constrained by the harmonic termination circuits to be at the fundamental frequency only, i.e., a sine wave. The voltage at the output may not be restricted at the odd harmonic frequencies, and therefore can attain the values at odd harmonics necessary to describe a square wave, as illustrated in FIG. 10B. At this point, i.e., with a square waveform, one of the active semiconductor devices 102 or 104 saturates, preventing any further increase in harmonic voltages. It is assumed that the device input drive signal (Vdrive) is sufficient to support the device current at all points of the sinewave current waveform illustrated in FIG. 10C. This is not trivial, as both bipolar transistors and field effect transistors exhibit non-linearities that result in sinewave drive signals not being able to support a sinewave current near the zero crossings, referred to as "crossover distortion." However, if the devices are forward-biased with sufficient quiescent current (herein referred to as "class-AB bias"), then crossover distortion may be avoided. With practical device parameters, as determined using the design procedures consistent with the present invention, a drain voltage waveform as illustrated in FIG. 11 may be obtained.

Figure 11:
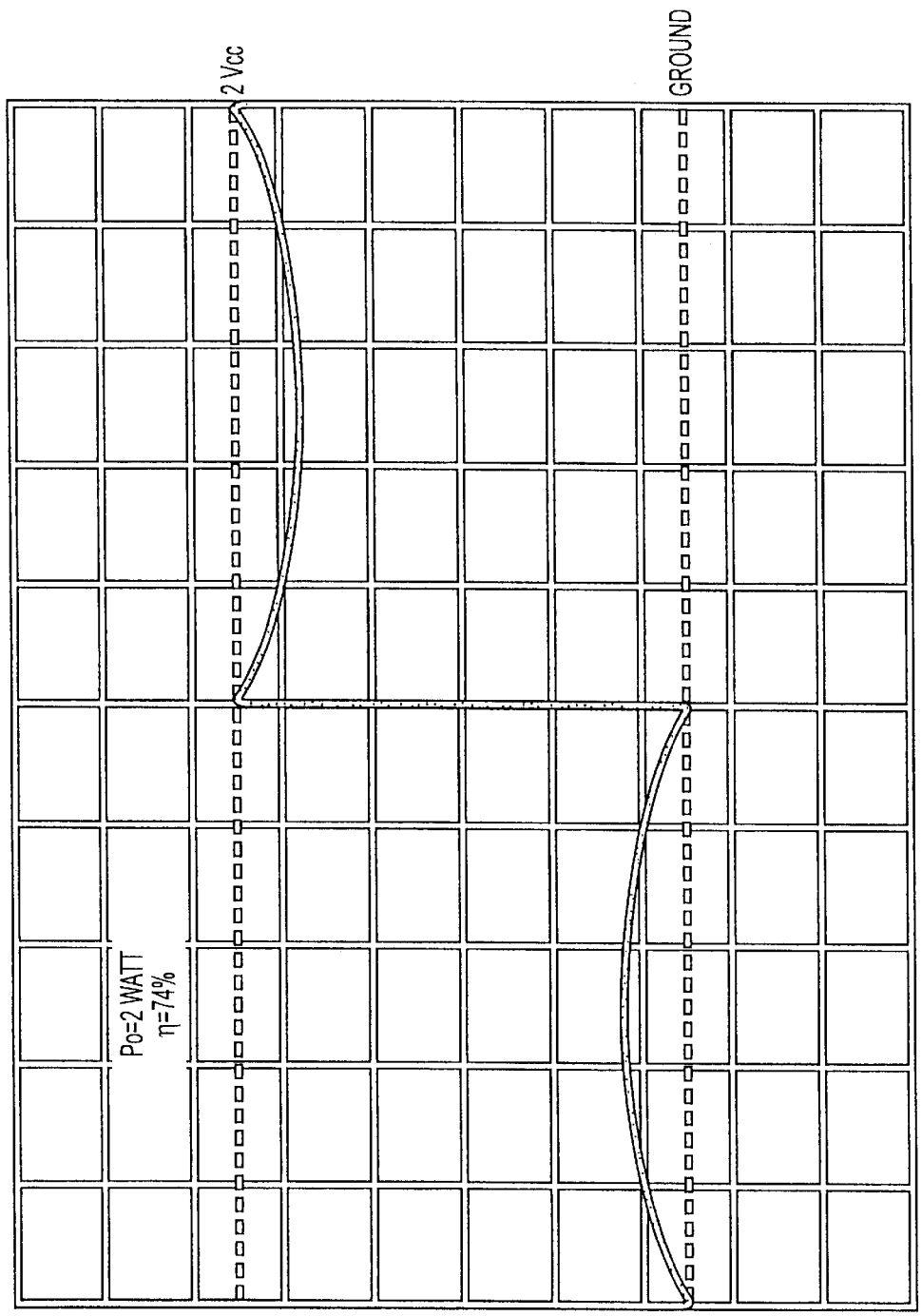
FIG. 11 illustrates a drain voltage waveform for a forward-biased amplifier, consistent with the present invention.

Referring to FIG. 11, the voltage waveform is approximately a square wave, except for droop in the centers of the half cycles where the sine wave current is peaking, due to finite on-resistance of the active devices. The efficiency of this amplifier was observed to be approximately 74%. This waveform may also be obtained with devices conforming to the electrical models illustrated in FIGS. 12A–12B.

Figure 12B:
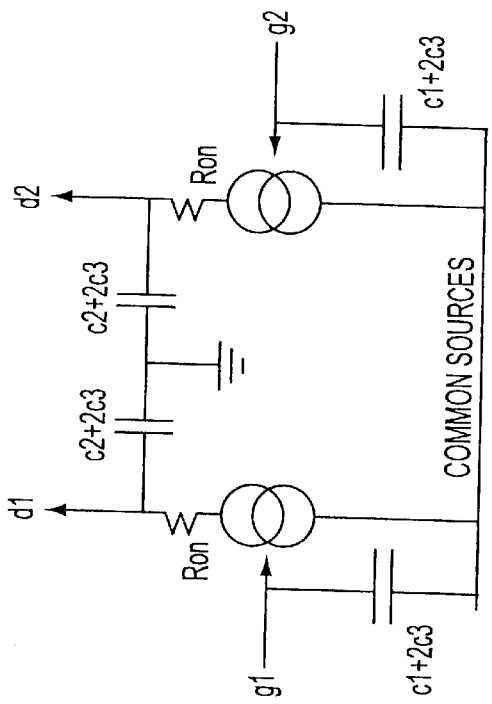
FIGS. 12A–12B illustrate amplifier circuits employed in implementations consistent with the present invention.
Figure 12B:
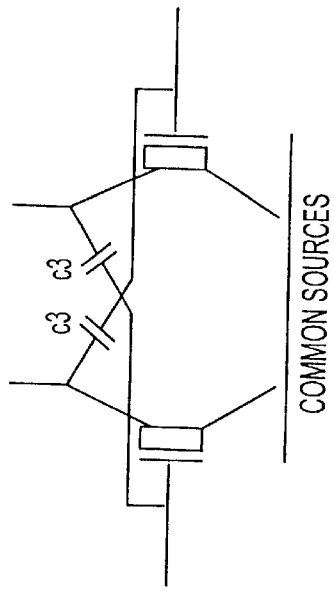
Figure 12A:
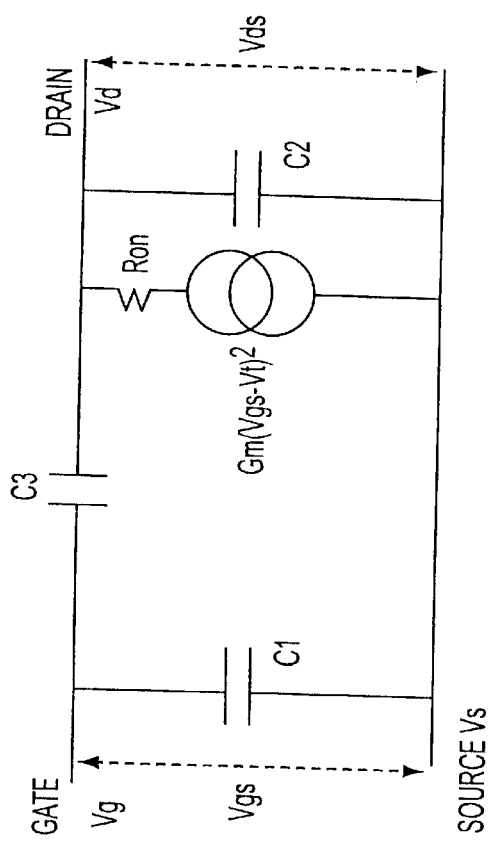
Figure 13:
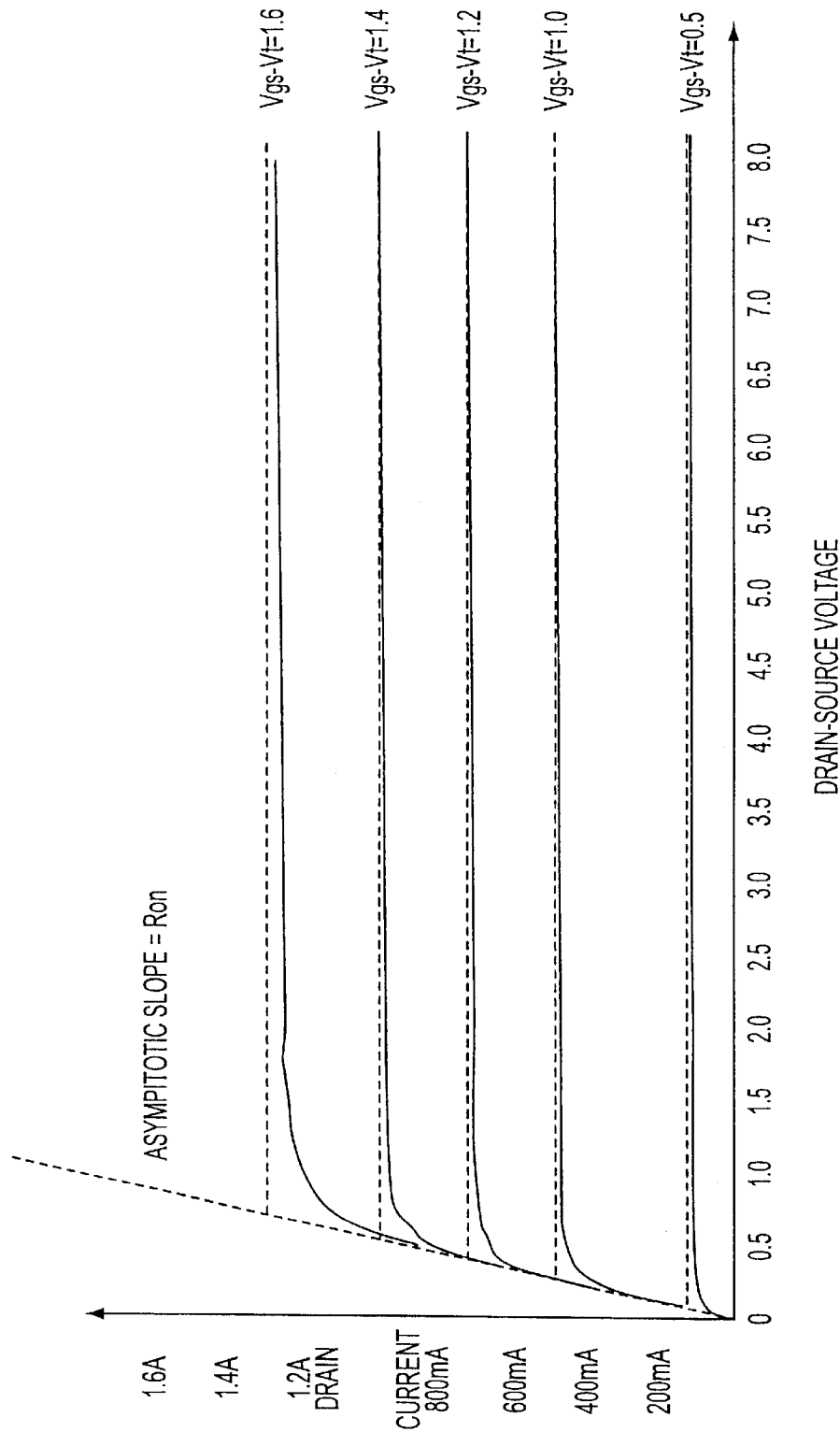
FIG. 13 is a graph of drain current versus drain voltage for different gate-source voltages, consistent with the present invention.

FIG. 12A represents a single FET model and FIG. 12B represents a cross-neutralized push-pull pair. The dependence of Ids on Vds and Vgs for the FET model depicted in FIG. 12A is illustrated in FIG. 13. Referring to FIG. 13, for high Vds, the drain current saturates at a value given by $Gm(Vgs-Vt)^2$, assuming a square-law, enhancement mode device. For low Vds, the current is limited by the ON-resistance Ron to Vds/Ron, even for large Vgs. These two asymptotes are exhibited by the equation $$Ids = \frac{(I1)(I2)}{(I1+I2)}$$

where $I1=Gm(Vgs-Vt)^2$ and $I2=Vds/Ron$ for positive Vds and positive (Vgs-Vt). For negative (Vgs-Vt), $I1=1$ μa(leakage).
This equation limits the current to $I1=Gm(Vgs-Vt)^2$ when Vds would make I2 large, or else it limits it to $I2=Vds/Ron$ when Vgs would make I1 large.

Simulations were done for push-pull pairs of symmetric, insulated-gate FETs, such as that illustrated in FIG. 12B, with the following parameters:
Vcc=3 volts
Gm=0.5 mhos/volt
Ron=0.5 ohms
Vt=0.4 volts (may be irrelevant, as gate bias is added)
$R_L$=8 ohms drain-to-drain at the fundamental.

Figure 14:
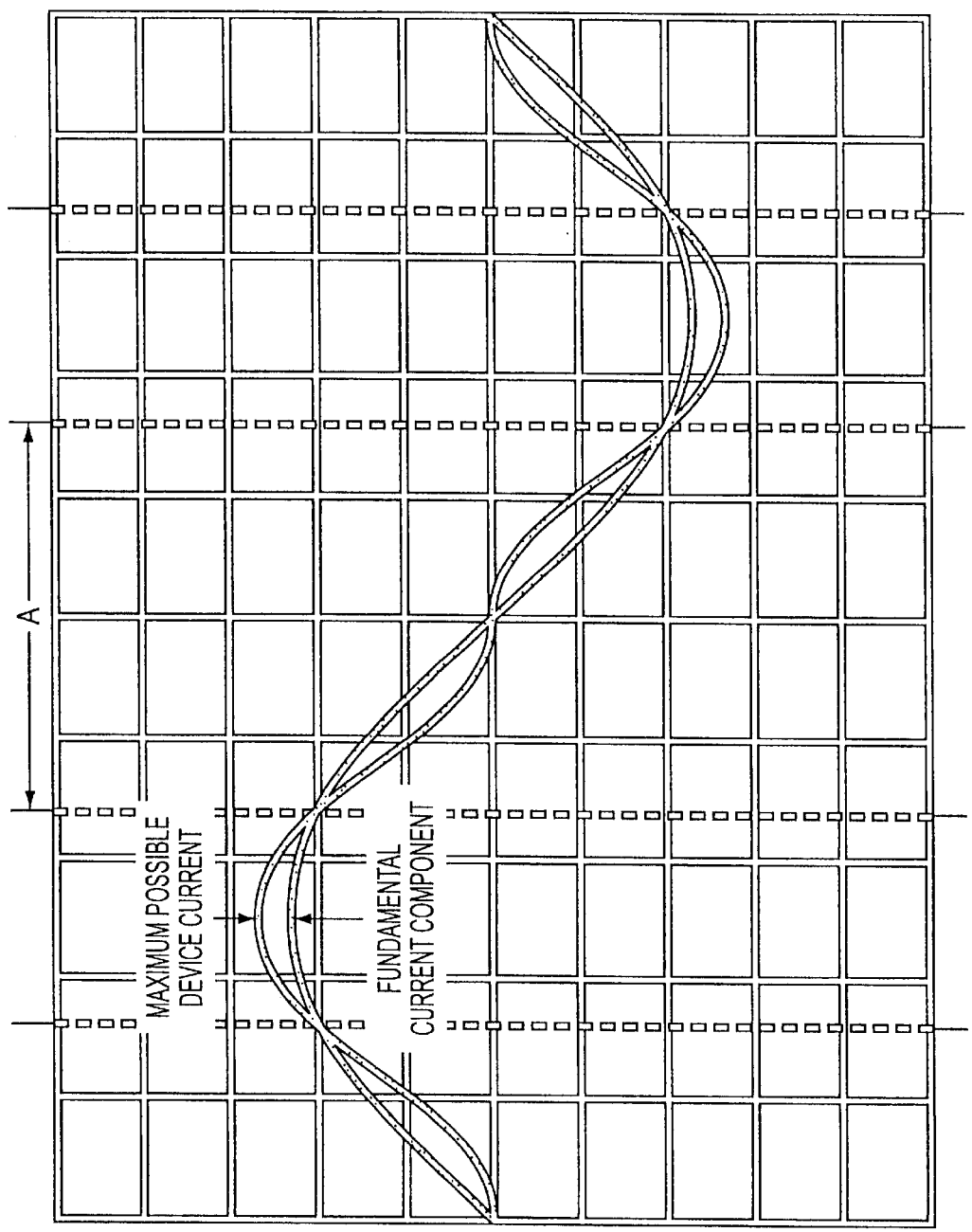
FIG. 14 illustrates a sine wave drive waveform for an amplifier over a whole cycle.

If the class-AB bias is reduced, the device cannot support the sinewave current waveform values (which are mandated by the suppression of harmonics) near the zero-crossing, as illustrated by area A in FIG. 14.

Figure 15:
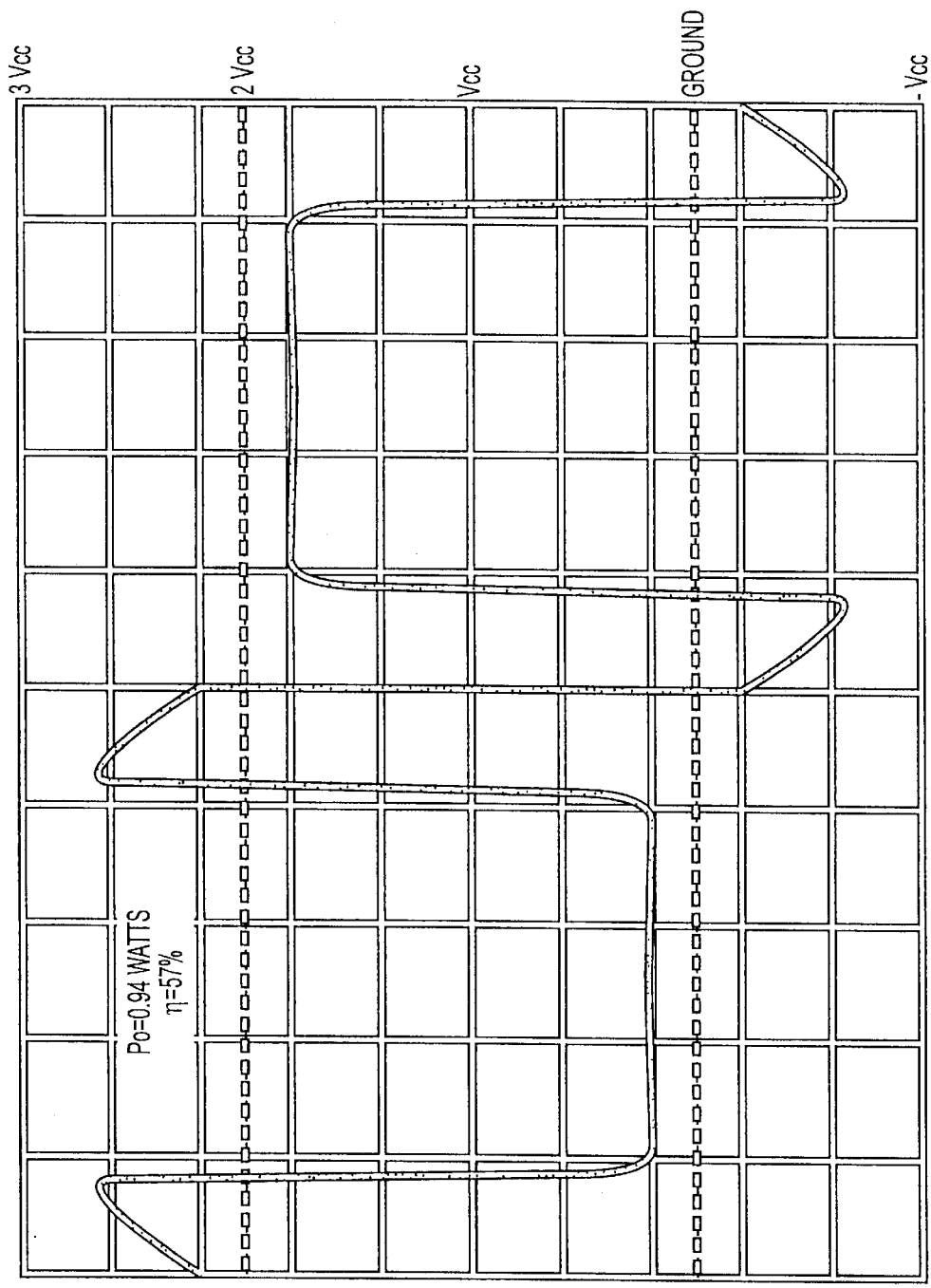
FIG. 15 illustrates a drain waveform for an amplifier with no forward bias.
Figure 16:
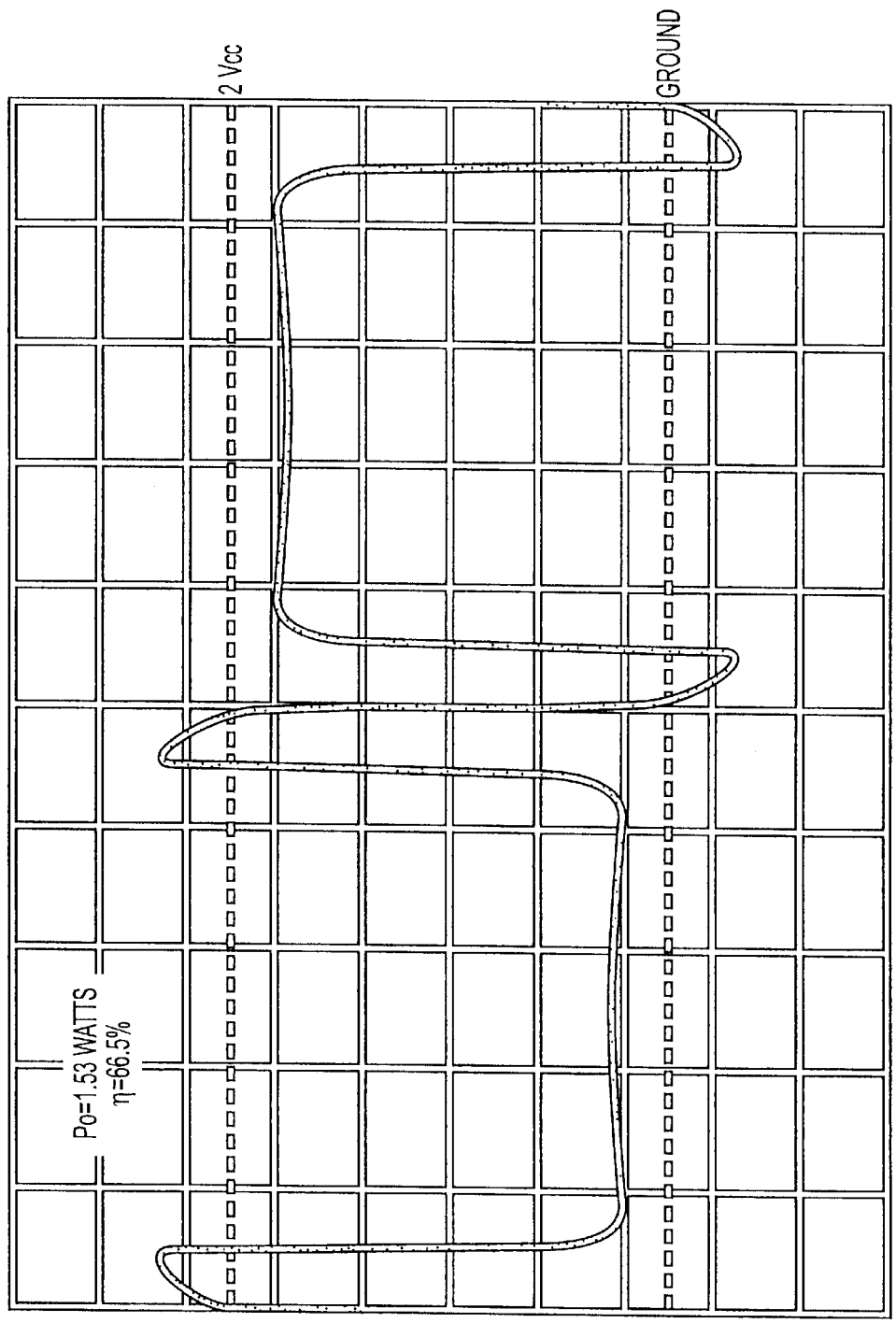
FIG. 16 illustrates a drain waveform for an amplifier with forward bias.

Due to the square-law characteristic of a FET, the supportable current falls more quickly to zero than the drive voltage. Thus, with a sinewave drive voltage and with the output current constrained by the harmonic filter to be sinusoidal, the devices come out of saturation near the zero crossings, as shown in FIGS. 15 and 16, where FIG. 15 illustrates a drain waveform for an amplifier with no forward bias and FIG. 16 illustrates a drain waveform for an amplifier with forward bias.

Figure 17:
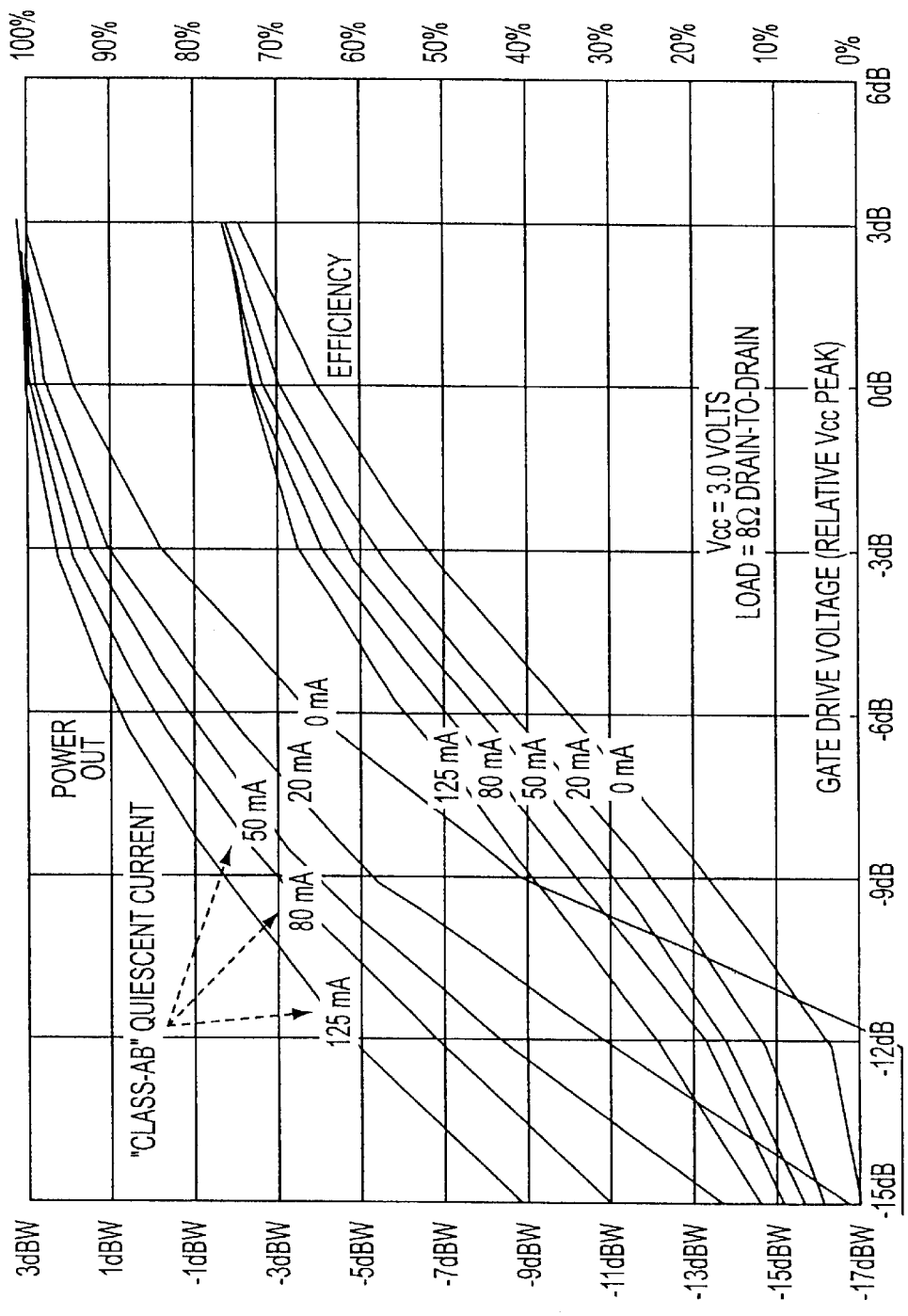
FIG. 17 illustrates the efficiency of a class-F push-pull amplifier with odd-harmonics terminating through the 13th harmonic.

The effect of the drive level and class-AB bias on the efficiency are shown in FIG. 17. The class-AB bias results in the amplifier exhibiting an input/output curve that can be approximated to a linear amplifier if chosen optimally. Residual non-linearity can be compensated using predistortion in a digital signal processor that generates the modulation waveforms.

Thus, the class-F amplifier can be rendered useful for linear amplification despite output voltage waveforms (FIGS. 15 and 16) that show little resemblance to the signal being amplified. However, the fundamental frequency component of the waveforms of FIGS. 15 and 16 is approximately proportional to the amplifier input drive signal amplitude when class-AB bias is used.

Figure 18:
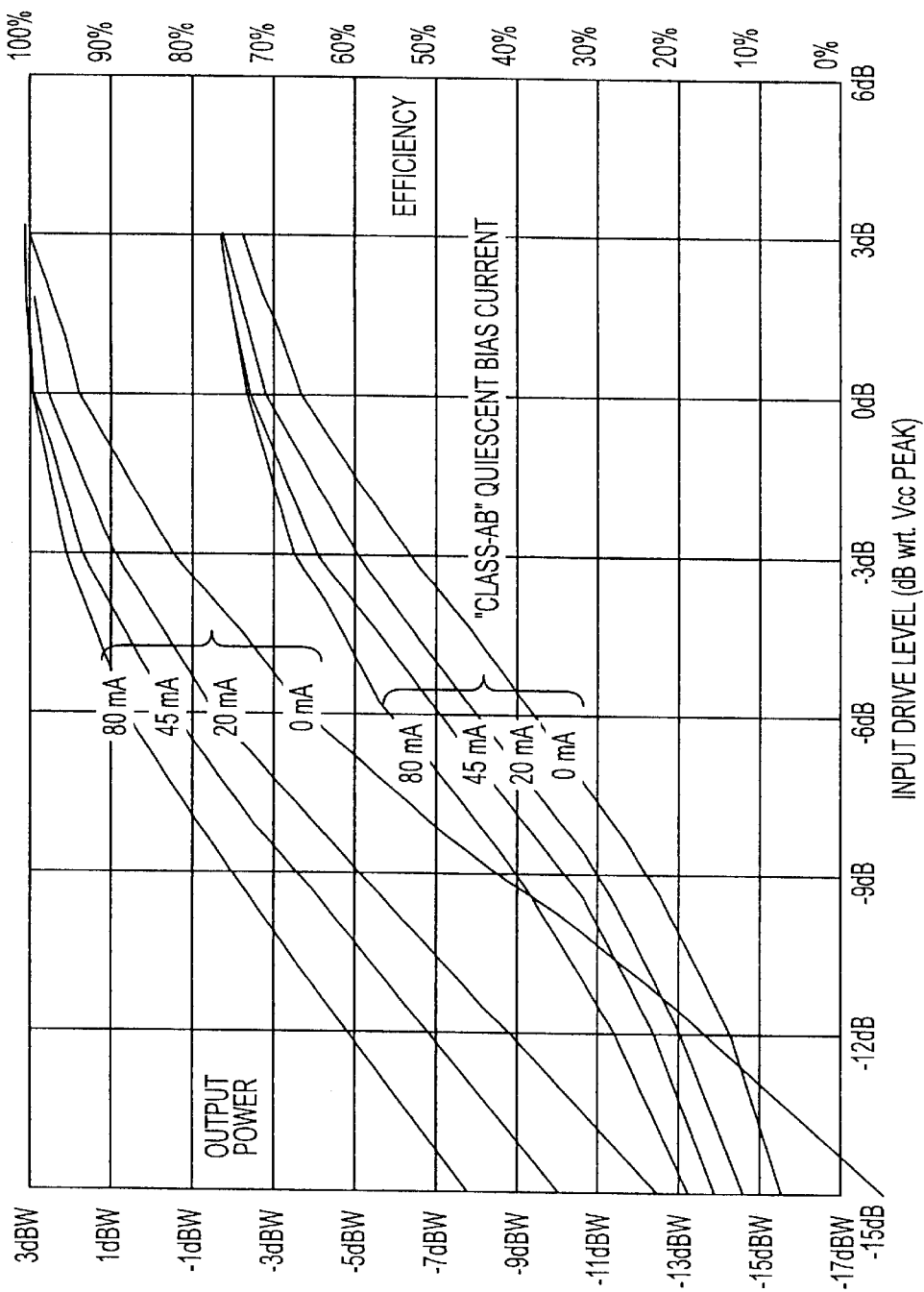
FIG. 18 illustrates the efficiency of a class-F amplifier with all odd harmonics terminated in an open circuit.

Finally, in FIG. 18, the effect of drive level and class-AB bias on the efficiency are shown for the case of ideal terminations at all odd harmonic frequencies. By comparison with FIG. 17, it can be seen that there is only a small difference at about the mid-power levels in the achieved efficiency compared with truncating the harmonic matching circuit at the 13th harmonic.

Thus, a systematic practical method of designing and fabricating harmonic termination and matching networks has been disclosed. The harmonic matching network, consistent with implementations of the present invention may be constructed using a printed stripline pattern on, for example, a Gallium Arsenide substrate. The efficient saturated amplifier of the present invention may be used to amplify modulation waveforms of varying envelopes through use of supply voltage modulation. For varying amplitude modulations, the amplifier may alternatively form part of a Doherty-type amplifier or may be incorporated in a Chireix outphasing configuration, or hybrids of the aforementioned. This allows amplifiers, such as class-F microwave amplifiers, to be used for optimum efficiency. Alternatively, it has been shown that class-F amplifiers may be used for linearly amplifying varying-amplitude signals by the use of predistortion.

The present invention is described herein in the context of an amplifier used in a cellular device, such as a mobile terminal. As used herein, the term "mobile terminal" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

The foregoing description of the embodiments of the present invention provides illustration and description, but is not intended to be exhaustive or to limit the invention to the precise form disclosed. Modifications and variations are possible in light of the above teachings or may be acquired from practice of the invention.

For example, the present invention has been described in the context of an amplifier in a mobile terminal. The present invention, however, may be implemented in other devices or systems, such as a base station. Further, while a number of variations of the present invention based on discrete components, transmission lines and hybrids thereof have been described, one of ordinary skill in the art would recognize that other configurations may be used in implementations consistent with the present invention. No element, step, or instruction used in the description of the present application should be construed as critical or essential to the invention unless explicitly described as such.

Additionally, the present invention may be embodied as cellular communication systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example, but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a RAM, a ROM, an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Further, the present invention is described herein in the context of an amplifier used in a GSM cellular communication system, a U.S. AMPS system, a D-AMPS system or a IS136 system. While the present invention may be particularly useful for improving the performance of devices in such systems, it should be understood that the principles of the present invention may be applied to any cellular or wireless system utilizing other air interfaces, such as time division multiple access (TDMA), code division multiple access (CDMA) or frequency division multiple access (FDMA). It should be further understood that the principles of the present invention may be utilized in hybrid systems that are combinations of two or more of the above air interfaces. In addition, a mobile terminal, in accordance with the present invention, may be designed to communicate with a base station transceiver using any standard based on GSM, TDMA, CDMA, FDMA, a hybrid of such standards or any other standard.

The scope of the invention is defined by the claims and their equivalents.

What is claimed is:

1. A transmitter power amplifier for converting power from a direct current (DC) supply to radio frequency power (RF) in a load resistance, comprising:

an amplifier comprising at least one active output device, the amplifier having an output capacitance; and a harmonic terminating and impedance matching network comprising a plurality of sections coupled between said amplifier and the load resistance, a first section nearest said amplifier creating an impedance at the at least one active output device which is resonant with said output capacitance at a highest harmonic frequency and compensates for said output capacitance to produce a high impedance at said highest harmonic frequency, and a second section nearest the load resistance creating an impedance at said at least one active output device which resonates with said output capacitance at a lowest harmonic frequency and compensates for said output capacitance to produce a high impedance at said lowest harmonic frequency.

2. The transmitter power amplifier of claim 1, wherein the harmonic terminating and impedance matching network further comprises:

a number of intermediate sections located between the first and second sections, each intermediate section compensating for said output capacitance to produce a high impedance at an intermediate harmonic frequency between the highest and lowest harmonic frequencies, said intermediate harmonic frequency being higher for a section nearer said amplifier and being lower for a section nearer said load resistance.

3. The transmitter power amplifier of claim 1, wherein said plurality of sections comprises two sections and terminates two odd harmonics.

4. The transmitter power amplifier of claim 1, wherein said lowest harmonic frequency is a third harmonic.

5. The transmitter power amplifier of claim 1, wherein said at least one active output device forms a single-ended amplifier and said harmonic terminating and impedance matching network produces high impedance at said at least one active output device for at least two odd harmonics and a low impedance at a second harmonic.

6. The transmitter power amplifier of claim 1, wherein each of said plurality of sections transforms a resistive impedance at its respective input at the fundamental frequency to a resistive impedance at its respective output.

7. The transmitter power amplifier of claim 6, wherein said at least one active output device forms a single-ended amplifier and said harmonic terminating and impedance matching network produces high impedance at said at least one active output device for a third harmonic and a low impedance at a second harmonic.

8. The transmitter power amplifier of claim 1, wherein said at least one active output device comprises a push-pull amplifier.

9. The transmitter power amplifier of claim 1, wherein said at least one active output device is biased to consume a non-zero quiescent current from said DC supply to produce a substantially linear output in relation to an amplifier input signal.

10. The transmitter power amplifier of claim 9, wherein the amplifier predistorts the amplitude of the amplifier input signal to produce amplified signals that follow a desired amplitude modulation.

11. The transmitter power amplifier of claim 1, wherein said harmonic termination and impedance matching network comprises alternating series inductors and shunt, series-resonant harmonic traps.

12. The transmitter power amplifier of claim 1, wherein said harmonic termination and impedance matching network comprises alternating series inductors and shunt, open-circuit stub traps.

13. The transmitter power amplifier of claim 1, wherein said harmonic terminating network comprises sections of transmission lines alternating with shunt open-circuit stub traps.

14. The transmitter power amplifier of claim 1, wherein each of the plurality of sections comprises a series element and a shunt element.

15. The transmitter power amplifier of claim 14, wherein said series element comprises at least one of a transmission line section and a series inductor.

16. The transmitter power amplifier of claim 14, wherein said shunt element comprises at least one of a series-resonant trap and an open-circuit transmission-line stub trap.

17. In a mobile terminal comprising an amplifier having an output capacitance, a method comprising:

converting power from a direct current (DC) power supply to radio frequency (RF) power, via the amplifier;

creating a first impedance at an output of the amplifier, the first impedance resonating with the output capacitance at a first harmonic frequency and compensating for the output capacitance to produce a high impedance at the first harmonic frequency; and creating a second impedance at the output of the amplifier, the second impedance resonating with the output capacitance of the amplifier at a second harmonic frequency and compensating for the output capacitance to produce a high impedance at the second harmonic frequency.

18. The method of claim 17, wherein the first and second harmonic frequencies represent odd harmonics.

19. The method of claim 17, further comprising:

outputting the RF power to a transmit device.

20. The method of claim 17, further comprising:

generating a plurality of impedances at the output of the amplifier, each of the plurality of impedances resonating with the output capacitance at a respective harmonic frequency between the first and second harmonic frequencies.

21. The method of claim 20, further comprising:

producing a high impedance at each respective harmonic frequency including the effects of the output capacitance.

22. A class-F amplifier, comprising:

an input receiving a sinusoidal drive signal;

at least one active output device receiving the sinusoidal drive signal, the at least one active output device being forward-biased with a predetermined current; and a harmonic network coupled to the at least one active output device, the harmonic network terminating odd harmonic frequencies to generate a substantially square wave output voltage signal waveform and sinusoidal output current waveform, wherein the predetermined current is sufficient to substantially reduce distortion in the substantially square wave output voltage waveform in the vicinity of zero crossings of the output current waveform.

23. A mobile terminal, comprising:

an amplifier that converts power from a direct current (DC) power supply to radio frequency power (RF), the amplifier having an output capacitance;

a circuit coupled to the amplifier, the circuit comprising a plurality of sections, each section comprising at least one element that generates an impedance that resonates with the output capacitance at one of a number of respective odd harmonic frequencies and creates a high impedance to the amplifier at the respective odd harmonic frequency; and a transmit device coupled to the circuit, the transmit device receiving the RF power.

\* \* \* \* \*